US012467785B2

(12) United States Patent
Lim et al.

(10) Patent No.: US 12,467,785 B2
(45) Date of Patent: Nov. 11, 2025

(54) CASCADED, SELF-CALIBRATED, SINGLE-PIXEL INFRARED HADAMARD TRANSFORM SPECTROMETER

(71) Applicant: NATIONAL UNIVERSITY OF SINGAPORE, Singapore (SG)

(72) Inventors: Zi Heng Lim, Singapore (SG); Yi Qi, Singapore (SG); Senthil Kumar Anantharajan, Singapore (SG); Chengkuo Lee, Singapore (SG); Guangya Zhou, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 113 days.

(21) Appl. No.: 18/292,507

(22) PCT Filed: Jul. 22, 2022

(86) PCT No.: PCT/SG2022/050523
§ 371 (c)(1),
(2) Date: Jan. 26, 2024

(87) PCT Pub. No.: WO2023/009069
PCT Pub. Date: Feb. 2, 2023

(65) Prior Publication Data
US 2024/0377252 A1    Nov. 14, 2024

(30) Foreign Application Priority Data
Jul. 26, 2021  (SG) .............................. 10202108094S

(51) Int. Cl.
*G01J 3/02*    (2006.01)
*G01J 3/12*    (2006.01)
*G01J 3/28*    (2006.01)

(52) U.S. Cl.
CPC ........... *G01J 3/0229* (2013.01); *G01J 3/0216* (2013.01); *G01J 3/0289* (2013.01); *G01J 3/12* (2013.01);
(Continued)

(58) Field of Classification Search
CPC ......... G01J 2003/1204; G01J 2003/285; G01J 2003/2866; G01J 3/0208; G01J 3/0216;
(Continued)

(56) References Cited

U.S. PATENT DOCUMENTS 7,034,935 B1    4/2006   Kruzelecky
8,922,769 B2 *  12/2014  Smith ................... G01J 3/2846
                                                           356/328

(Continued)

FOREIGN PATENT DOCUMENTS

CN        105527242 A       4/2016
WO      2014159626 A1      10/2014
(Continued)

OTHER PUBLICATIONS

Food Chemistry, 2020, 323, 126820.
(Continued)

*Primary Examiner* — Hina F Ayub
(74) *Attorney, Agent, or Firm* — Volpe Koenig

(57) ABSTRACT

Infrared spectrometer and method of performing infrared spectrometry. In one embodiment, the method comprises the steps of providing a first single pixel detector sensitive to infrared light in a first spectral range; providing an entrance slit for receiving an infrared light signal; disposing a moveable encoding mask between the entrance slit and the first single pixel detector for encoding based multiplexing, the moveable encoding mask comprising at least three adjacent coding sections along an encoding moving direction thereof, each coding section comprising the same coding pattern in (Continued)

a cyclic manner such that a last encoding step of one encoding section is the same as a first encoding step in a next encoding section step; disposing a dispersion and imaging optics between the entrance slit and the moveable encoding mask for dispersing the infrared signal and for imaging the dispersed infrared signal onto the moveable encoding mask; disposing a collection optics between the moveable encoding mask and the first single pixel detector for collecting an encoding based multiplexed version of the infrared signal onto the first single pixel photodetector; selectively allowing only one of at least first and second bands within the first spectral range to be imaged onto respective ones of the coding sections excluding a first coding section along the encoding moving direction of the moveable encoding mask, in a starting position of the moveable encoding mask; and moving the moveable encoding mask in the encoding moving direction for the encoding based multiplexing.

20 Claims, 14 Drawing Sheets

(52) U.S. Cl.
CPC ......... *G01J 2003/1204* (2013.01); *G01J 3/28* (2013.01); *G01J 2003/2866* (2013.01)
(58) Field of Classification Search
CPC ...... G01J 3/0229; G01J 3/0289; G01J 3/0297; G01J 3/12; G01J 3/18; G01J 3/28; G01J 3/2846
See application file for complete search history.

(56) References Cited

U.S. PATENT DOCUMENTS

| | | | |
|---|---|---|---|
| 9,234,839 | B2 | 1/2016 | Hruska |
| 9,651,422 | B2 | 5/2017 | Saptari |
| 2005/0243312 | A1 | 11/2005 | Geshwind |

FOREIGN PATENT DOCUMENTS

| | | |
|---|---|---|
| WO | 2015101992 A2 | 7/2015 |
| WO | 2015162197 A2 | 10/2015 |
| WO | 2021021020 A1 | 2/2021 |
| WO | 2021029827 A1 | 2/2021 |

OTHER PUBLICATIONS

P. T. Lin et al., "Mid-Infrared Spectrometer Using Opto-Nanofluidic Slot-Waveguide for Label-Free On-Chip Chemical Sensing," Nano Letters, vol. 14, No. 1, pp. 231-238, 2014.
C. Hecker et al., "Thermal Infrared Spectrometer for Earth Science Remote Sensing Applications-Instrument Modifications and Measurement Procedures," (in English), Sensors, vol. 11, No. 11, pp. 10981-10999, 2011.
E. J. N. Marques and S. T. de Freitas, "Performance of new low-cost handheld NIR spectrometers for nondestructive analysis of umbu (Spondias tuberosa Arruda) quality," Food Chemistry, vol. 323, p. 126820, 2020.
H. Gao et al., "InGaAs Spectrometer and F-P Filter Combined FBG Sensing Multiplexing Technique," Journal of Lightwave Technology, vol. 26, No. 14, pp. 2282-2285, 2008.
H. Zappe, Y.-H. Park, W. Piyawattanametha, Y. Du, and G. Zhou, "A MEMS-driven Hadamard transform spectrometer," presented at the MOEMS and Miniaturized Systems XVII, 2018.
Y. M. S. Mazen Erfan, Mohammad Sakr, Bassem Mortada, Mostafa Medhat, and Diaa Khalil, "On-Chip Micro-Electro-Mechanical System Fourier Transform Infrared (MEMS FT-IR) Spectrometer-Based Gas Sensing," Appl. Spectrosc., vol. 70, No. 5, pp. 897-904, 2016.
Y. Sabry et al., Ultra-compact MEMS FTIR spectrometer (SPIE Commercial + Scientific Sensing and Imaging). SPIE, 2017.
T. S. Pandian Chelliah, Sheela Singh, and Annie Sujatha, "Simulation of path delay multiplexing-based Fourier transform spectrometer for fiber Bragg grating interrogation," Appl. Opt., vol. 54, No. 30, pp. 8867-8871, 2015.
M. F. Duarte et al., "Single-pixel imaging via compressive sampling," IEEE Signal Processing Magazine, vol. 25, No. 2, pp. 83-91, 2008.
G. Zhou, Y. Qi, Z. H. Lim, and G. Zhou, "Single-Pixel MEMS Spectrometer Based on Compressive Sensing," IEEE Photonics Technology Letters, vol. 32, No. 5, pp. 287-290, 2020.
M. K. Bellamy, "Hadamard transform-Fourier transform-infrared spectrometry," Ph.D., Kansas State University, Ann Arbor, 9614250, 1995.
M. Harwit and N. J. A. Sloane, "Hadamard Transform Optics," Academic Press, New York, 1979.
"Encoder module P11159-201AS", online document from Hamamatsu, https://www.hamamatsu.com/resources/pdf/ssd/p11159-201as_kpc1093e.pdf.
Micromachines, 2020, 11(2), 219.
IEEE Photonics Technology Letters, 2020, 32(5), 287-290.
Optics Communications, 470, 2020, 125813.
Proceedings SPIE 10568, International Conference on Space Optics—ICSO 2004; 105680Q, 2017.
Applied Spectroscopy, 2018, 72(12), 1701-1751.
Optics Express, 2019, 27(18), 25457-25469.
Product, Spectral Evolution, https://spectralevolution.com/remote-sensing/.
Search Report issued in corresponding European Patent Application No. 22 849 999.2 on Sep. 27, 2024, consisting of 8 pp.
M, Qi et al. "Hadamard transform-based hyperspectral imaging using a single-pixel detector", Optic Express, vol. 28, No. 11, May 25, 2020, p. 16126, XP093206603.
Busch, Kenneth W. et al. "Design and Evaluation of a Near-Infrared Dispersive Spectrometer That Uses a He—Ne Laser for Automatic Internal Wavelength Calibration", Applied Spectroscopy, vol. 56, No. 3, Mar. 1, 2002. pp. 346-349.

* cited by examiner

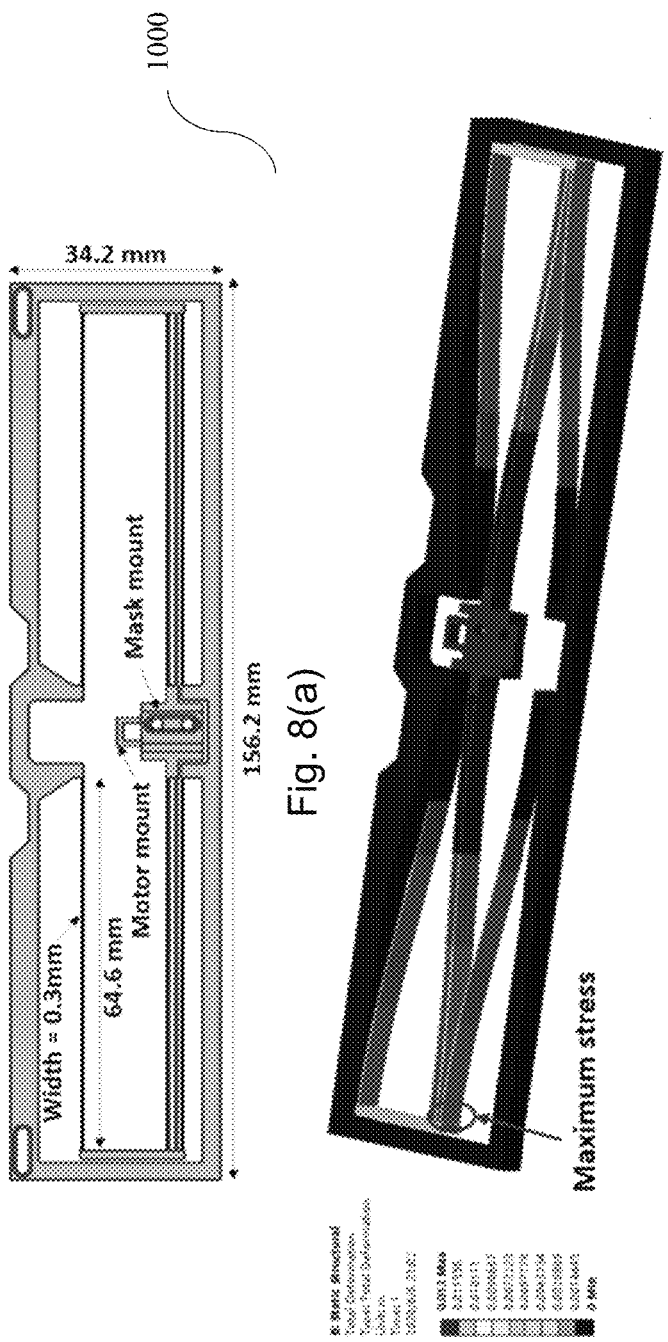
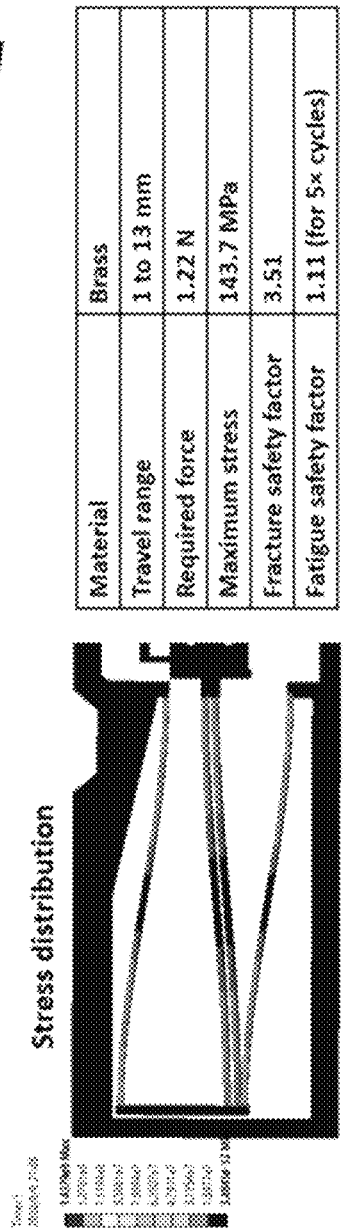

CASCADED, SELF-CALIBRATED, SINGLE-PIXEL INFRARED HADAMARD TRANSFORM SPECTROMETER

FIELD OF INVENTION

The present invention relates broadly to an infrared spectrometer and a method of performing infrared spectrometry, in particular to a cascaded, and/or self-calibrated, single-pixel infrared Hadamard transform spectrometer.

BACKGROUND

Any mention and/or discussion of prior art throughout the specification should not be considered, in any way, as an admission that this prior art is well known or forms part of common general knowledge in the field.

The infrared (IR) wavelength range, in particular the mid-infrared (mid-IR) wavelength range, ranging from 2.5 µm to 25 µm, is very useful in spectroscopy due to its ability to uniquely identify compounds. It can be subdivided into the group frequency region (2.5 µm to 6.9 µm) and the fingerprint region (6.9 µm to 25 µm). Many diatomic molecules have absorption bands in the group frequency region arising from stretching vibrations, while the fingerprint region contains numerous complex and therefore unique peaks because of the mix of bending vibrations and stretching vibrations. As such, mid-IR spectroscopy has seen wide applications in different fields including environmental monitoring, pharmaceutics, polymer identification, food processing and agriculture, among others.

However, the desire to build a portable mid-IR spectrometer for field uses has been hindered by various obstacles. The Fourier transform infrared (FTIR) spectrometer, usually constructed based on a Michelson interferometer design, is a staple in laboratories owing to its broad wavelength sensing range and high resolution. Because it requires precision movable optomechanics, it is sensitive to external disturbances, limiting it to a controlled laboratory environment. Therefore, it has not been successfully miniaturized for field uses.

On the other hand, the traditional dispersive spectrometer has good performance at a low cost in the visible to near-infrared (VNIR) wavelength range (0.4 µm to 1 µm) by virtue of the well-researched and well-developed silicon-based array detector, which has very efficient photon-to-electron conversion in this spectral region. Further in the IR region, however, silicon is blind, and array detectors in IR dispersive spectrometers would require non-silicon-based technologies, such as PbSe, InSb and HgCdTe for the mid-IR wavelengths. These array detectors are bulky, expensive, and suffer from poor performance, making them an unappealing option for a portable mid-IR spectrometer as well. Laser-based mid-IR spectroscopic devices have also been demonstrated in literature, but the cost of such systems are exorbitant due to the use of IR lasers.

An encoding-based multiplexing spectrometer also adopts a single-pixel detector and thus can be applied to IR wavelengths conveniently. This type of spectrometer typically uses an encoding mask as the light modulator. Therefore, the encoding algorithm is a key part of the system. Conventional encoding algorithm adopts a set of overcomplete non-orthogonal random patterns to encode the object, therefore, the number of measurements is much higher than the pixel number of the final result. An extended data acquisition time is necessary, and the low quality of the recovery result limits the application of this method. Compressive sensing has gained popularity in recent decades as it can reduce the number of measurements while maintaining decent image quality. A compressive sensing encoding algorithm is normally implemented with a digital micromirror device (DMD), which can be operated by the computer. The micromirrors on the modulator can reflect the light beam in two directions, representing '0' and '1' in the compressive sensing pattern. As the DMD can only operate in the VNIR wavelength region, compressive sensing has a spectral range limitation. Additionally, because the number of encoded measurements is less than the number of wavelengths recovered in the spectrum, a longer computational time is required for recovery, limiting its application in field uses for real-time imaging.

Instead of using non-orthogonal random encoding patterns, Hadamard transform (HT) uses Hadamard matrices to generate orthogonal patterns. The first advantage of HT is the high quality of the recovered image. Although compressive sensing can reduce the measurement time, the images recovered by compressive sensing still consist of many noise points. The measurement number in HT is the same as the total number of pixels in the recovered image, therefore HT can reconstruct a perfect image in the ideal case. Secondly, HT is a multiplexing scheme that can enhance the SNR of the image. The recovery time of HT is also much shorter than compressive sensing and thus can be used for real-time imaging. A typical HT spectrometer can be implemented with a DMD or a moving mask. Since a DMD can only be operated in the VIS-NIR wavelength range, the moving encoding mask is the typical light modulator used in an IR HT spectrometer. The HT spectrometer can take the same form as a typical dispersive spectrometer, except that a moveable encoding mask is used in place of a detector array at the focal plane. Light that is transmitted through the mask will be collected onto a single-pixel detector. A commonly used encoding pattern in HT spectrometer is the cyclic S-matrix [M. S. Harwit and N. J. A. Sloane, *Hadamard Transform Optics*. (Academic 1979)]. Taking a cyclic S-matrix of order 7 as an example, the first encoding pattern for the first measurement is as follows:

$$S_1 = [1\ 1\ 1\ 0\ 1\ 0\ 0]$$

where '1' refers to light landing on that pixel being transmitted through the mask and collected on the single-pixel detector, and '0' refers to light landing on that pixel being blocked and does not enter the single-pixel detector.

A dispersed spectrum of wavelengths $\lambda_1$ to $\lambda_7$ corresponds to the first encoding pattern $S_1$. Recall that the measurement number in HT must be the same as the total number of pixels in the recovered spectrum, therefore, the encoding pattern must be altered another six more times (because the dispersed spectrum is fixed in its position and therefore cannot be moved). Since the cyclic S-matrix is cyclic, the second encoding pattern in the sequence for the second measurement simply requires the first value of $S_1$ to be shifted to the end of the matrix. The encoding is shifted by one step for every measurement, as such the full encoding pattern for all seven measurements are:

$$S_1 = [1\ 1\ 1\ 0\ 1\ 0\ 0]$$
$$S_2 = [1\ 1\ 0\ 1\ 0\ 0\ 1]$$

-continued $$S_3 = [1\ 0\ 1\ 0\ 0\ 1\ 1]$$

$$S_4 = [0\ 1\ 0\ 0\ 1\ 1\ 1]$$

$$S_5 = [1\ 0\ 0\ 1\ 1\ 1\ 0]$$

$$S_6 = [0\ 0\ 1\ 1\ 1\ 0\ 1]$$

$$S_7 = [0\ 1\ 1\ 1\ 0\ 1\ 0]$$

In mathematical form, the spectrum can be recovered by:

M=SI where M is the measurement matrix, S is the cyclic S-matrix and I is the intensity of wavelengths of interest. In the above example, the spectrum can be recovered by doing an inverse HT:

$$\begin{bmatrix} I_{\lambda_1} \\ I_{\lambda_2} \\ I_{\lambda_3} \\ I_{\lambda_4} \\ I_{\lambda_5} \\ I_{\lambda_6} \\ I_{\lambda_7} \end{bmatrix} = \begin{bmatrix} 1 & 1 & 1 & 0 & 1 & 0 & 0 \\ 1 & 1 & 0 & 1 & 0 & 0 & 1 \\ 1 & 0 & 1 & 0 & 0 & 1 & 1 \\ 0 & 1 & 0 & 0 & 1 & 1 & 1 \\ 1 & 0 & 0 & 1 & 1 & 1 & 0 \\ 0 & 0 & 1 & 1 & 1 & 0 & 1 \\ 0 & 1 & 1 & 1 & 0 & 1 & 0 \end{bmatrix}^{-1} \begin{bmatrix} M_1 \\ M_2 \\ M_3 \\ M_4 \\ M_5 \\ M_6 \\ M_7 \end{bmatrix}$$

With a cyclic encoding pattern, the construction of the physical mask in the above example requires a total of 13 pixels (in contrast the number of pixels in the recovered spectrum, which is 7, i.e. the same as the number of measurements) for a full set of encoding (2n-1 for a cyclic S-matrix of order n), as each step on this mask shifts it to the next encoding pattern:

$$S_{mask} = [1\ 1\ 1\ 0\ 1\ 0\ 0\ 1\ 1\ 1\ 0\ 1\ 0]$$

In a HT spectrometer design, the resolution and the spectral range of the spectrometer are determined by the pixel number and moving range of the encoding mask. The spatial separation of the slit images from $\lambda_1$ to $\lambda_M$ on the exit aperture plane needs to be large in order to achieve high spectral resolution, which translates to the requirement of a wide exit aperture and thus a large translational movement of the encoding mask to achieve a full encoding as explained in the example above. This makes the existing HT spectrometer design implemented with a moving mask difficult to be miniaturized for field uses.

Embodiments of the present invention seek to address at least one of the above problems.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 8A shows a schematic illustrating parameters of a beam structure for stable movement of the mask, according to an example embodiment.

FIG. 8B shows the finite element analysis conducted in Ansys of the beam structure of FIG. 8A.

SUMMARY

Figure 1:
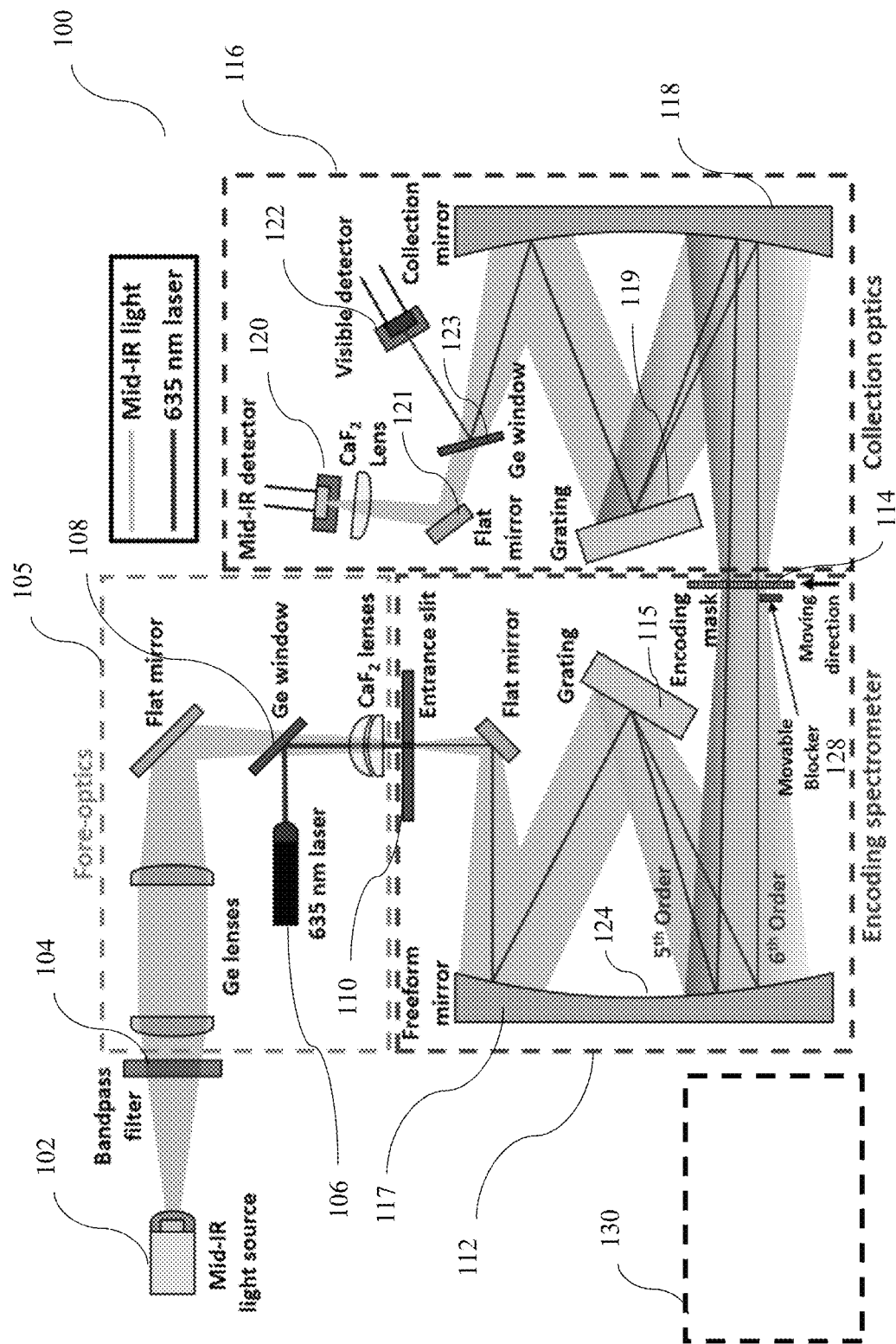
FIG. 1 shows a layout of a single-pixel mid-IR spectrometer according to an example embodiment.

In accordance with a first aspect of the present invention, there is provided an infrared spectrometer comprising:
- a first single pixel detector sensitive to infrared light in a first spectral range;
- an entrance slit for receiving an infrared light signal;
- a moveable encoding mask disposed between the entrance slit and the first single pixel detector for encoding based multiplexing, the moveable encoding mask comprising at least three adjacent coding sections along an encoding moving direction thereof, each coding section comprising the same coding pattern in a cyclic manner such that the last encoding step of one section is the same as the first encoding step in the next section;
- a dispersion and imaging optics disposed between the entrance slit and the moveable encoding mask for dispersing the infrared signal and for imaging the dispersed infrared signal onto the moveable encoding mask;
- a collection optics disposed between the moveable encoding mask and the first single pixel detector for collecting an encoding based multiplexed version of the infrared signal onto the first single pixel photodetector; and
- a band selection optics for selectively allowing only one of at least first and second bands within the first spectral range to be imaged onto respective ones of the coding sections excluding a first coding section along the encoding moving direction of the moveable encoding mask, in a starting position of the moveable encoding mask.

In accordance with a second aspect of the present invention, there is provided an infrared spectrometer comprising:
- a first single pixel detector sensitive to infrared light in a first spectral range;
- an entrance slit for receiving an infrared light signal;
- a moveable encoding mask disposed between the entrance slit and the first single pixel detector for encoding based multiplexing, the moveable encoding mask comprising one or more adjacent coding sections;
- a dispersion and imaging optics disposed between the entrance slit and the moveable encoding mask for dispersing the infrared signal and for imaging the dispersed infrared signal onto the moveable encoding mask;
- a collection optics disposed between the moveable encoding mask and the first single pixel detector for collecting an encoding based multiplexed version of the infrared signal onto the first single pixel photodetector; and
- a second single pixel detector sensitive to a wavelength of a reference laser signal, wherein the dispersion and imaging optics is configured to image the reference laser signal received via the entrance slit onto the moveable encoding mask and the collection optics is configured for collecting the reference laser signal comprised in the encoding based multiplexed version of the infrared signal onto the second single pixel detector for calibration of a recovered spectrum of interest within the first spectral range in the first single pixel detector.

In accordance with a third aspect of the present invention, there is provided method of performing infrared spectrometry comprising the steps of:
- providing a first single pixel detector sensitive to infrared light in a first spectral range;
- providing an entrance slit for receiving an infrared light signal;
- disposing a moveable encoding mask between the entrance slit and the first single pixel detector for encoding based multiplexing, the moveable encoding mask comprising at least three adjacent coding sections along an encoding moving direction thereof, each coding section comprising the same coding pattern in a cyclic manner such that a last encoding step of one encoding section is the same as a first encoding step in a next encoding section step;
- disposing a dispersion and imaging optics between the entrance slit and the moveable encoding mask for dispersing the infrared signal and for imaging the dispersed infrared signal onto the moveable encoding mask;
- disposing a collection optics between the moveable encoding mask and the first single pixel detector for collecting an encoding based multiplexed version of the infrared signal onto the first single pixel photodetector;
- selectively allowing only one of at least first and second bands within the first spectral range to be imaged onto respective ones of the coding sections excluding a first coding section along the encoding moving direction of the moveable encoding mask, in a starting position of the moveable encoding mask; and
- moving the moveable encoding mask in the encoding moving direction for the encoding based multiplexing.

In accordance with a fourth aspect of the present invention, there is provided method of performing infrared spectrometry comprising the steps of:
- providing a first single pixel detector sensitive to infrared light in a first spectral range;
- providing an entrance slit for receiving an infrared light signal;
- disposing a moveable encoding mask between the entrance slit and the first single pixel detector for encoding based multiplexing, the moveable encoding mask comprising one or more adjacent coding sections;
- disposing a dispersion and imaging optics between the entrance slit and the moveable encoding mask for dispersing the infrared signal and for imaging the dispersed infrared signal onto the moveable encoding mask;
- disposing a collection optics between the moveable encoding mask and the first single pixel detector for collecting an encoding based multiplexed version of the infrared signal onto the first single pixel photodetector; and
- providing a second single pixel detector sensitive to a wavelength of a reference laser signal, wherein the method comprises configuring the dispersion and imaging optics to image the reference laser signal received via the entrance slit onto the moveable encoding mask and configuring the collection optics to collect the reference laser signal comprised in the encoding based multiplexed version of the infrared signal onto the second single pixel detector for calibration of a recovered spectrum of interest within the first spectral range in the first single pixel detector.

DETAILED DESCRIPTION

In an example embodiment, a single-pixel detector mid-infrared (mid-IR) Hadamard transform spectrometer is provided. The spectrometer's design, fabrication and experimental results according to an example embodiment are described herein. The single-pixel detector mid-IR Hadamard transform spectrometer according to an example embodiment has dual cascaded encoding regions, 2875 nm to 3500 nm and 3500 nm to 4077 nm, to reduce the travel range required by the moving mask. The encoded wavelength band is determined by the bandpass filter used for the respective cascaded coding regions. A 635 nm laser is used as a reference within the spectrometer to calibrate the recovered spectrum with accurate positioning. Experiments demonstrate that mid-IR spectrums can be accurately recovered in the designed wavelength range, according to an example embodiment. The spectrometer according to an example embodiment can be made portable and at low cost, suitable for IR spectroscopy in the field.

Since the spectrometer according to an example embodiment uses a single-pixel detector in conjunction with the multiplexing encoding scheme, the SNR is increased, improving the performance of a mid-IR spectrometer where array detectors are weak, bulky and expensive. Thus, a mid-IR Hadamard transform spectrometer according to an example embodiment can be more cost-effective and more compact (and thus more portable), with good performance.

A layout of a single-pixel mid-IR spectrometer 100 according to an example embodiment is illustrated in FIG. 1. The spectrometer 100 is designed to operate in a cascaded manner within the 2875 nm to 4077 nm wavelength range. Light from a mid-IR source 102 passes through the selected bandpass filter 104, allowing only the desired wavelength band to enter the fore-optics 105. It is combined with a 635 nm laser 106 using a germanium window 108 and passes through the entrance slit 110 into the encoding spectrometer portion 112, where they are dispersed onto an encoding mask 114 using diffraction grating 115 and freeform mirror 117. It is noted that for the different wavelength bands, the dispersion onto the encoding mask 114 is at different sections of the encoding mask 114, according to the wavelength dependence of dispersion, as will be appreciated by a person skilled in the art. The 635 nm laser 106 is used to calibrate the position of the recovered results. Its $5^{th}$ order and $6^{th}$ order dispersion share the same location on the mask with the 3175 nm and 3810 nm positions, respectively. This calibration mechanism according to an example embodiment will be elaborated on subsequently. Beyond the mask 114, the encoded signal is undispersed by a reversed spectrometer (see diffraction collection mirror 118, grating 119 and flat mirror 121) in the collection optics 116 as light within the allowed encoding range is too large to be focused onto a single-pixel detector with just a few lenses. However, it is noted that if the selected spectral dispersion allows, the encoded light can be collected by a series of lenses in a different example embodiment. The undispersed signal is once again split by a germanium window 123 to allow the encoded mid-IR light and the 635 nm laser to be collected, respectively, by their corresponding single-pixel detectors (Hamamatsu P13243-122MS InAsSb photovoltaic detector 120 and Hamamatsu S12698-04Si photodiode 122, in the example embodiment). A processor 130 for motor control, calibration processing and spectrum recovery is coupled to the spectrometer 1000.

Figure 2:
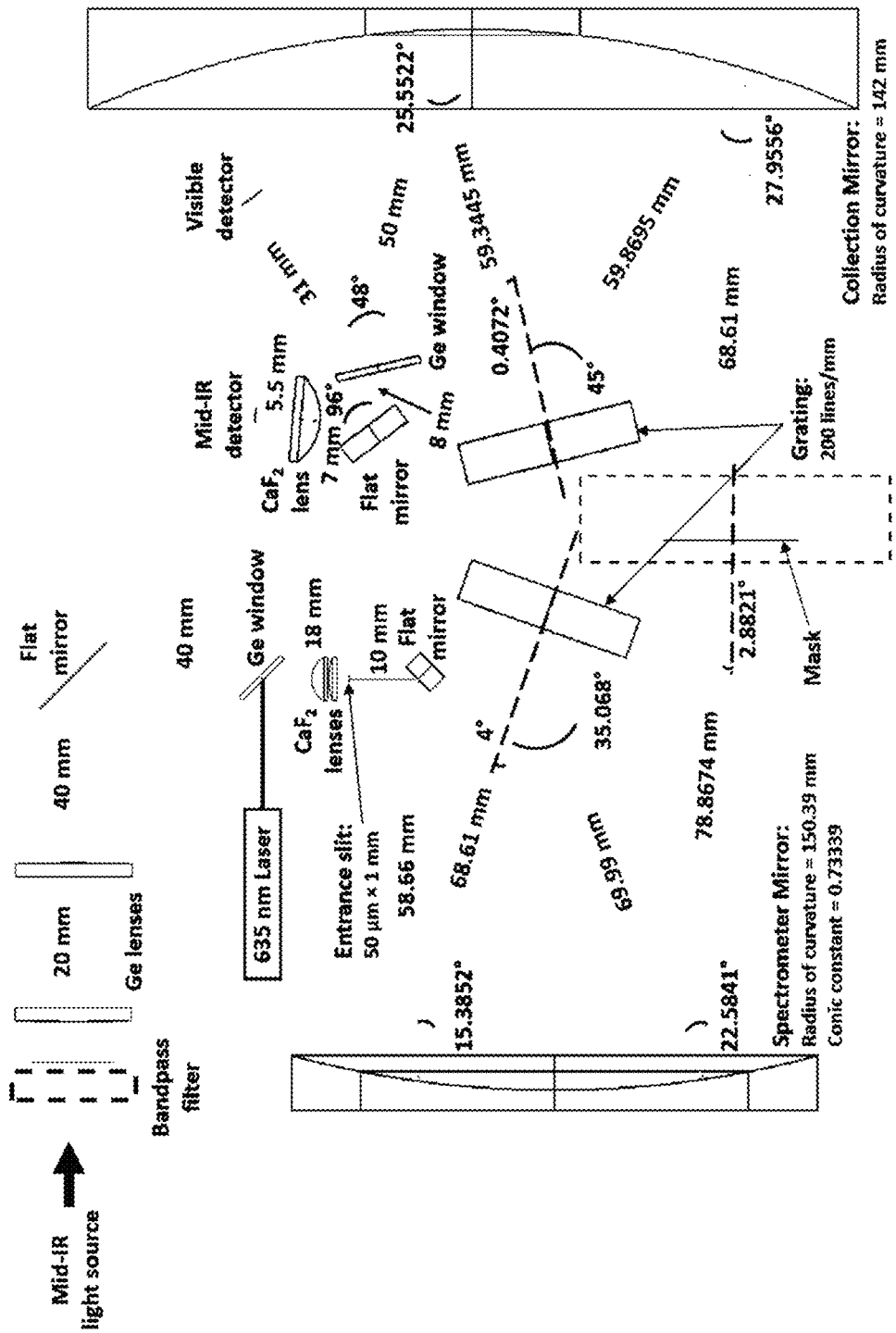
FIG. 2 shows the parameters of the optical design of a single-pixel mid-IR spectrometer according to an example embodiment.
Figures 3A, 3B:
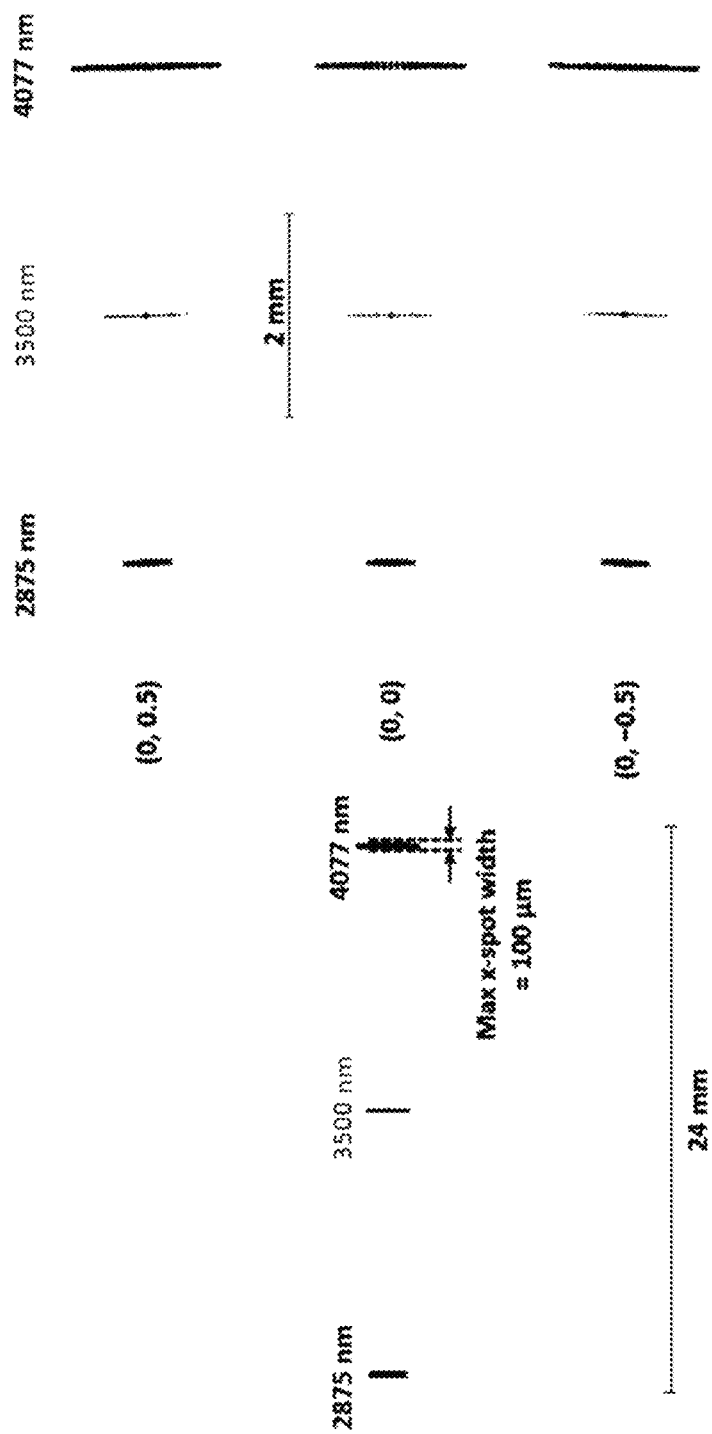
FIG. 3 shows the resultant spot diagrams of a single-pixel mid-IR spectrometer according to an example embodiment.

The optical design according to an example embodiment was conducted on Zemax OpticStudio. The encoding spectrometer portion 112 was designed based on the Ebert spectrometer and further optimized by varying the conic constant of the curved surface 124 to reduce the spot width in the x-direction. The parameters of the optical design and the resultant spot diagrams are detailed in FIGS. 2 and 3, respectively, according to an example embodiment. The minimum spot width is 100 µm with a corresponding slit width of 50 µm. In the collection optics 116, as aberration control is not required, a spherical collection mirror 118 is used instead.

The encoding spectrometer portion 112 is based on Hadamard transform and the encoding mask 114 utilizes a cyclic S-matrix sequence of order 103, with each pixel width being 110 µm. As such, the designed spectral resolution is approximately 6 nm.

Even though the encoding pattern is described with a cyclic S-matrix and Hadamard transform (HT) in the example embodiment described in detail herein, other cyclic encoding patterns and mathematical transforms can be used in different example embodiments, as will be appreciated by a person skilled in the art. As a non-limiting example, non-orthogonal random encoding patterns can be used if they are cyclic. While they may result in poorer reconstruction results, such an embodiment is nonetheless considered usable.

Figure 4:
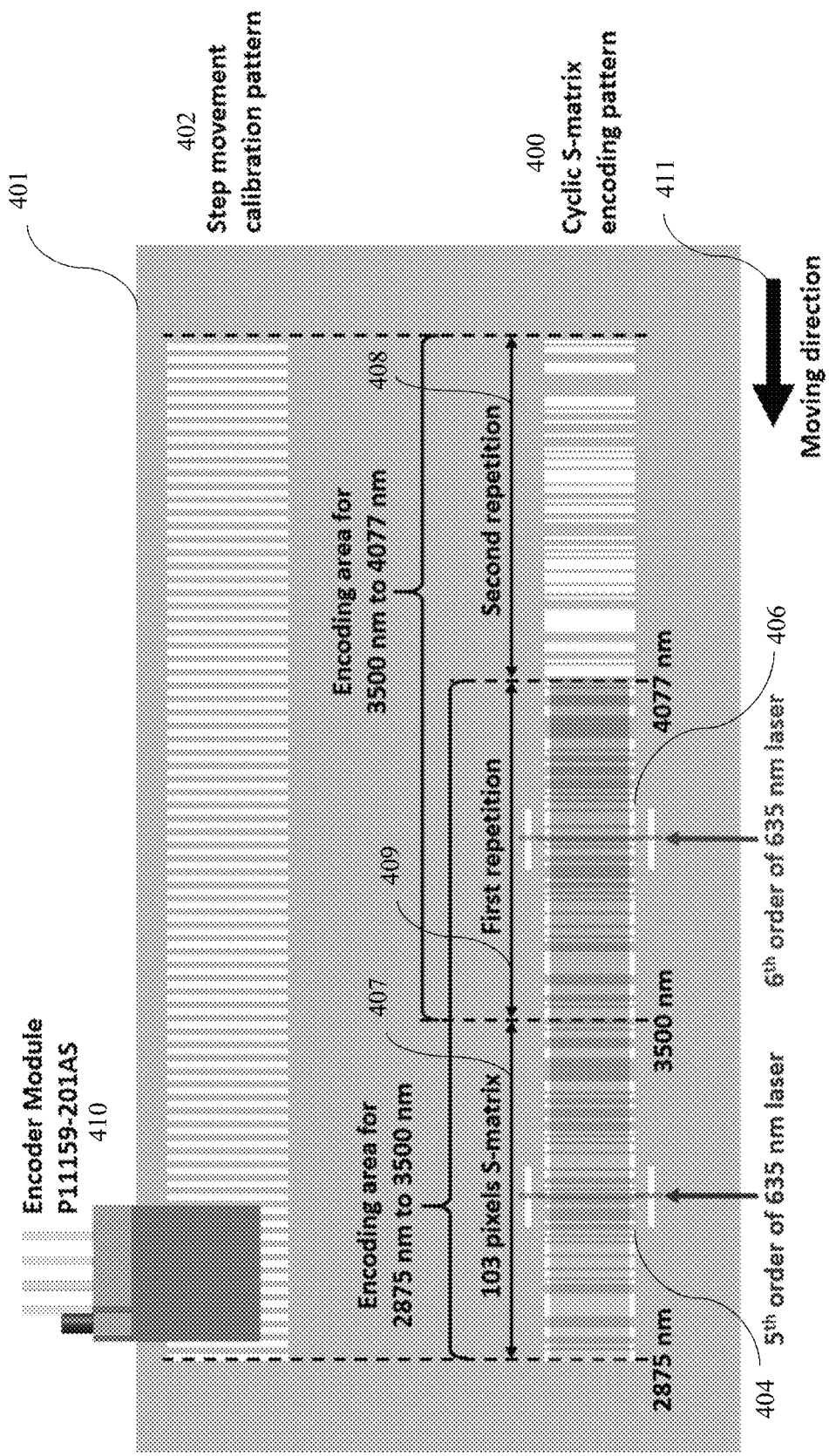
FIG. 4 shows an encoding mask for use in an example embodiment, with a set of step movement calibration pattern lying above a cyclic S-matrix encoding pattern.

The S-matrix consists of a sequence of '1' and '0'. The '1' encoding pixels on the mask 114 allow light upon those pixels to pass through it, while the '0' encoding pixels on the mask 114 block light upon those pixels from being transmitted through it. The cyclic S-matrix 400 and step movement calibration pattern 402 is illustrated in FIG. 4. In an example embodiment, the designed wavelength range of 2875 nm to 4077 nm is split into two cascaded bands 404, 406:2875 nm to 3500 nm and 3500 nm to 4077 nm. Each band 404, 406 covers 103 pixels with the same set 407, 409 of cyclic S-matrix pattern, sharing a pixel at 3500 nm. An additional set 408 of the same pattern is provided beyond the pixel at 4077 nm (i.e. first along the encoding moving direction 411) to encode the 3500 nm to 4077 nm band. Implementing a cascaded encoding scheme according to an example embodiment allows to reduce the travel range of the mask 114, hence allowing for a smaller and less costly motor to actuate the mask 114.

More specifically, in a conventional HT spectrometer, a full encoding for $\lambda_1$ to $\lambda_M$ requires the mask to move the distance of $\lambda_1$ to $\lambda_M$ a distance of x. By splitting one encoding for $\lambda_1$ to $\lambda_M$ to two same encoding steps, with one covering $\lambda_1$ to $\lambda_N$ and the other covering $\lambda_N$ to $\lambda_{2N-1}$ (whereby $\lambda_1$ to $\lambda_{2N-1}$ also covers the same distance x), the example embodiment can advantageously reduce the required moving distance to half of x. Because the encoding distance is halved, the fabricated mask pattern in an example embodiment can also be shortened from a length of 2x to 1.5x, with a total number of pixels on the moving mask being 3N-2. Reducing the required mask movement distance advantageously reduces the size of the motor and mask required, allowing the spectrometer according to an example embodiment to be more compact and portable. It will be apparent to those skilled in the art that the cascaded bands do not strictly have to be two non-overlapping bands, as long as the encoded band covers a maximum of N pixels within the designed wavelength range of $\lambda_1$ to $\lambda_{2N-1}$, and is within reach of the diffracted spectrum of the calibration laser. Similarly, it will be apparent to those skilled in the art that the cascading can extend beyond two bands to further reduce the mask travel distance. It is also noted that apart from bandpass filters, an appropriately sized moveable aperture can also be placed before the encoding mask to restrict the encoded wavelength range.

In the example embodiment described with reference to, e.g. FIG. 1, the minimum required travel range is 11220 µm.

i.e. roughly half of that required if both bands were encoded in one go. The $5^{th}$ order and $6^{th}$ order of the 635 nm laser signal is also encoded in the same way, with the $5^{th}$ order superimposed on 3175 nm acting as the calibration for the 2875 nm to 3500 nm band and the $6^{th}$ order superimposed on 3810 nm acting as the calibration for the 3500 nm to 4077 nm band. To encode one band in the example embodiment, the bandpass filter 104 of the desired range is placed in front of the system, while a moveable blocker 128 placed in front of the mask 114 is shifted to prevent the 635 nm laser signal located on the other band from passing through the mask. Both the mid-IR band of choice and the 635 nm laser signal are then encoded simultaneously. It is noted again that since the encoding pattern is cyclic, the number and range of the encoding wavelength bands described can be freely altered in different example embodiments based on the available bandpass filters, provided each band is restricted to a maximum number of pixels chosen for a desired designed spectral resolution, 103 pixels in the example embodiment, within the designed wavelength range, here 2875 nm to 4077 nm, and includes one of the orders of the laser, here 635, for calibration. It is noted that the reference laser does not have to be of visible (VIS) wavelengths. It can be of non-visible wavelengths as well in an example embodiment, but the cost associated with the laser and the corresponding single-pixel detector will increase.

With reference to FIG. 4, a set of step movement calibration pattern 402 lies above the cyclic S-matrix encoding pattern 400. This set of calibration pattern 402 is a simple set of repeated opaque and transparent pixels, with each pixel width being 220 μm, double the width of an S-matrix encoding pixel, according to an example embodiment. It is noted that, each pixel on the step movement pattern corresponding to one pixel on the cyclic S-matrix pattern can also be implemented in an example embodiment, together with a suitable encoder module. The start and end of the calibration pattern 400 lies exactly above the start and end of the full S-matrix encoding pattern 402, but not the entire row of pixels is required in different embodiments.

Only a minimum of 52 pixels of the calibration pattern 400 is required to cover at least 103 S-matrix encoding pixels, given that the movement of the encoding mask 401 corresponds to the extent of one sequence of the 103 pixel matrix. As shown in the example in FIG. 4, the (at least) first and second bands within the spectral range of 2875 nm to 4077 nm are imaged onto the 103 pixels S-matrix 407 and the first repetition 409 of the moveable encoding mask, respectively, in a starting position of the moveable encoding mask 401.

Figure 5:
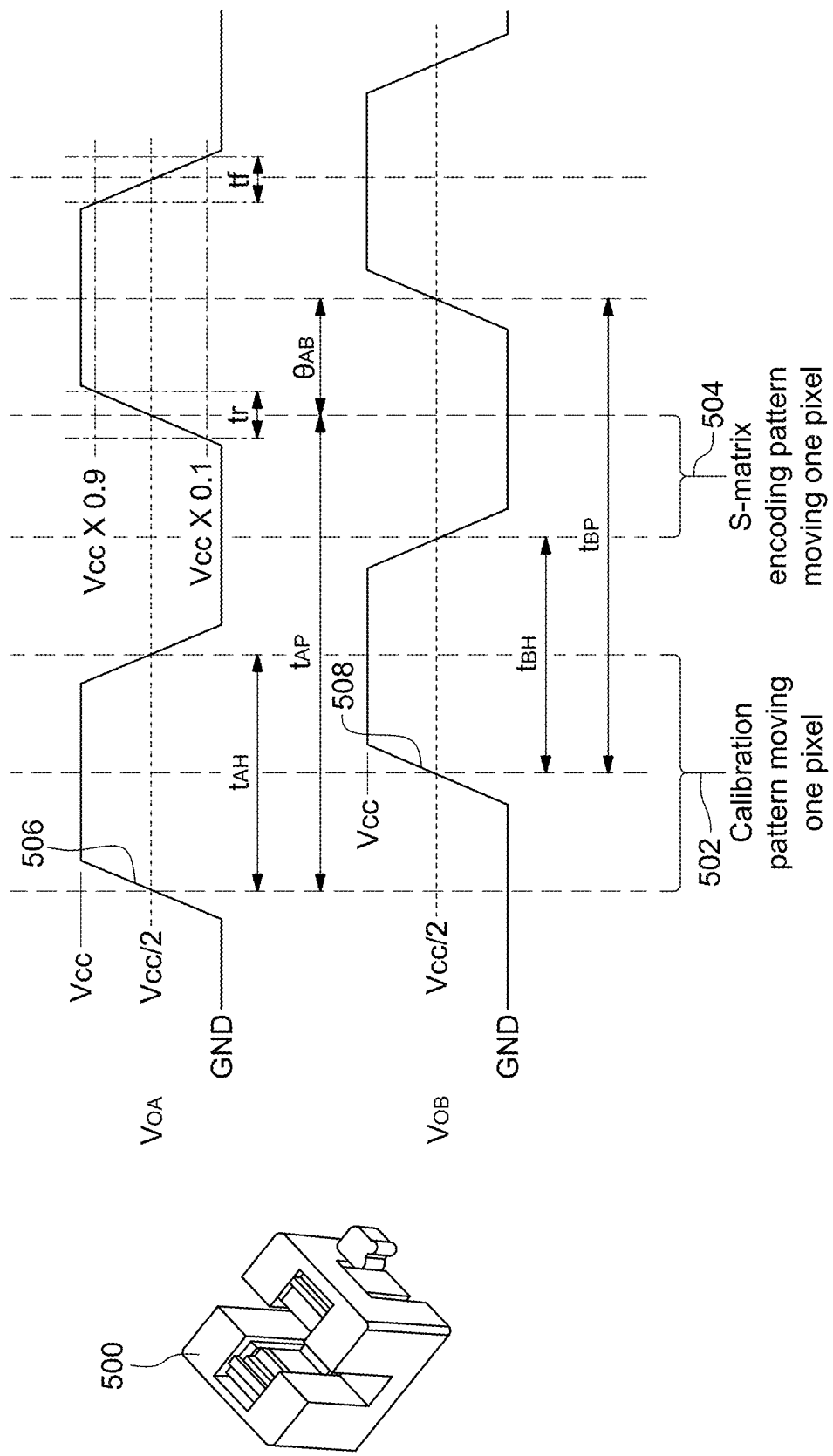
FIG. 5 shows a photograph of an encoder module for use in an example embodiment and the phase shifted outputs $V_{OA}$ (upper graph) and $V_{OB}$ (lower graph) of the encoder module.

The step movement calibration pattern 400 works with a low cost encoder module 410 (Hamamatsu P11159-201AS) in an example embodiment. It produces a two-phase digital signal output that matches the movement of the calibration pattern 400, allowing to retrieve the encoding position during the mask 114 movement. The working mechanism of the encoder module 410 used in the example embodiment is described in FIG. 5. Every pixel on the step movement calibration pattern is aligned with each pixel on the cyclic S-matrix encoding pattern. The phase shifted outputs $V_{OA}$ (upper graph) and $V_{OB}$ (lower graph) of the encoder module 500 are shown Due to the 90 degrees phase shift and because each calibration pixel 502 has twice the width of each S-matrix encoding pixel 504 according to an example embodiment, consecutive peak/valley transitions in either of the $V_{OA}$ (e.g. transition indicated at numeral 506) and $V_{OB}$ (e.g. transition indicated at numeral 508) readout corresponds to the mask moving the equivalent of one step or pixel 504 on the cyclic S-matrix encoding pattern, allowing to extract the correct measurements from the IR and VIS single-pixel detectors.

Both the mid-IR spectrum and the 635 nm laser are recovered by inverse Hadamard transform. At the $n^{th}$ encoding position (n=1, 2, . . . , N), the measured total intensity M(n) at each of the two single-pixel detector is:

$$M(n) = \sum_{j=1}^{N} S_n I(j) \quad (1)$$

where $S_n$ is weight of the S-matrix encoding at the $n^{th}$ encoding pattern, and I(j) is the wavelength intensity at the $j^{th}$ pixel.

Thus, the above equation can be simplified as:

$$M = SI \quad (2)$$

where S is the encoding S-matrix, M is the measurement matrix, and I is the spectrum of interest. Therefore, the spectrum I can be recovered by:

$$I = S^{-1} M \quad (3)$$

where $S^{-1}$ is the inverse matrix of S.

A total of 103 measurements is recorded in each encoding process according to an example embodiment. From the measurements, a recovery of the 635 nm laser is conducted first, with the first sequence of matrix S being the first sequence of the 103 S-matrix. Since the motor used does not come with positioning information, it is not known whether the first encoded measurement of the tested wavelength range corresponds exactly with the first sequence of the 103 S-matrix. Thus, the preliminary recovery of the 635 nm laser will allow us to determine the sequence offset. For example, it is known from the diffraction equation (compare 115 in FIG. 1) that the $5^{th}$ order of the 635 nm laser corresponds to pixel number 49 (also the 3175 nm position of the $1^{st}$ order IR light). If the initial recovered results show the 635 nm laser peak at pixel number 52, it is thus known that the sequence offset for S must be 3, and that S must be cyclically shifted forward by 3 positions. With S corrected with the required offset, another recovery is performed to get a positionally accurate mid-IR spectrum. Therefore, the spectrometer according to an example embodiment is self-calibrated, whereby it uses the 635 nm laser to figure out the starting position of the moving mask and thus the first sequence in S, which is then used to obtain the mid-IR spectrum with accurate positioning.

Figures 6A, 6B:
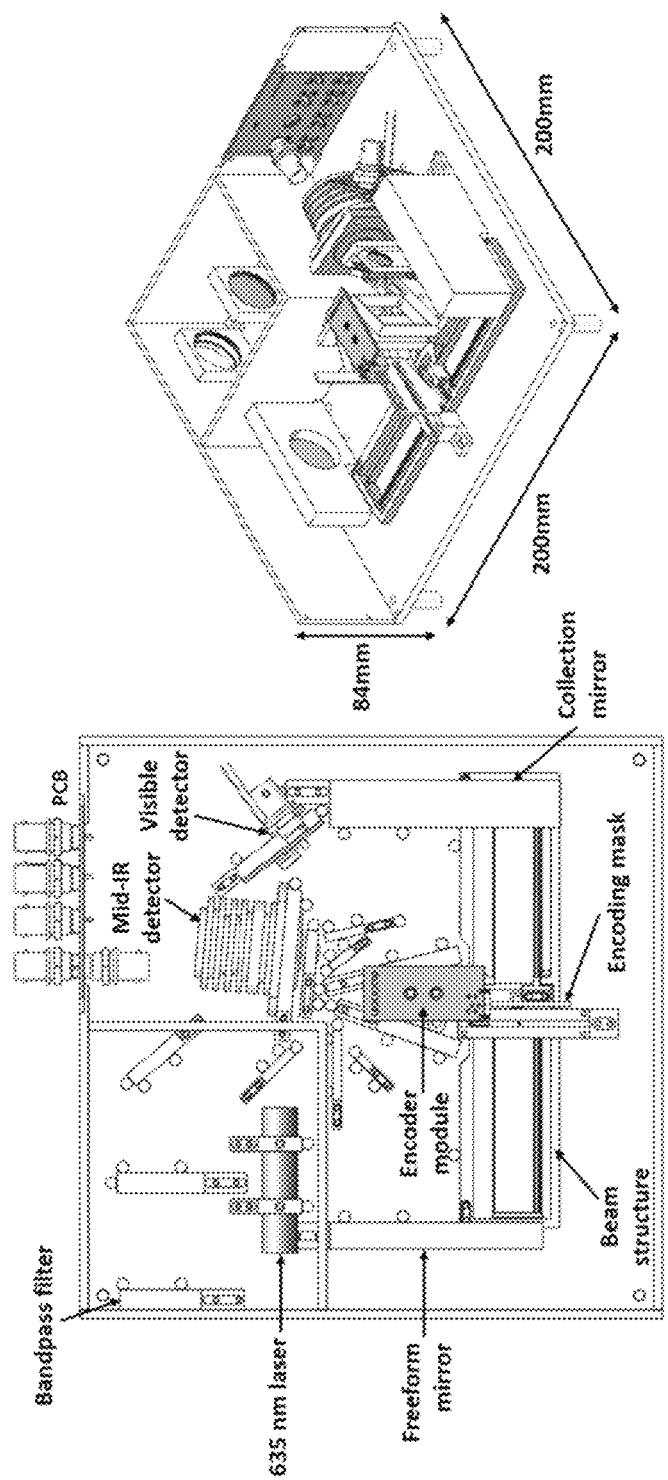
FIG. 6A shows the mechanical design of the spectrometer according to an example embodiment done in SolidWorks, in a top view.
FIG. 6B shows the mechanical design of the spectrometer according to an example embodiment done in SolidWorks, in a perspective view.

The mechanical design of the spectrometer according to an example embodiment is done in SolidWorks. FIG. 6 present a 3D model of the spectrometer 600 according to the example embodiment. Its dimensions are 200 mm×200 mm×84 mm, making it rather compact. The component holders were fabricated by precision machining and blackened to reduce stray light. The reflective optical surfaces were additionally diamond turned to obtain the required surface parameters and finish. They are then coated with gold for higher reflectivity in the mid-IR range. These components are aligned by dowel pins on the baseboard and tightened with screws.

Figures 7A, 7B:
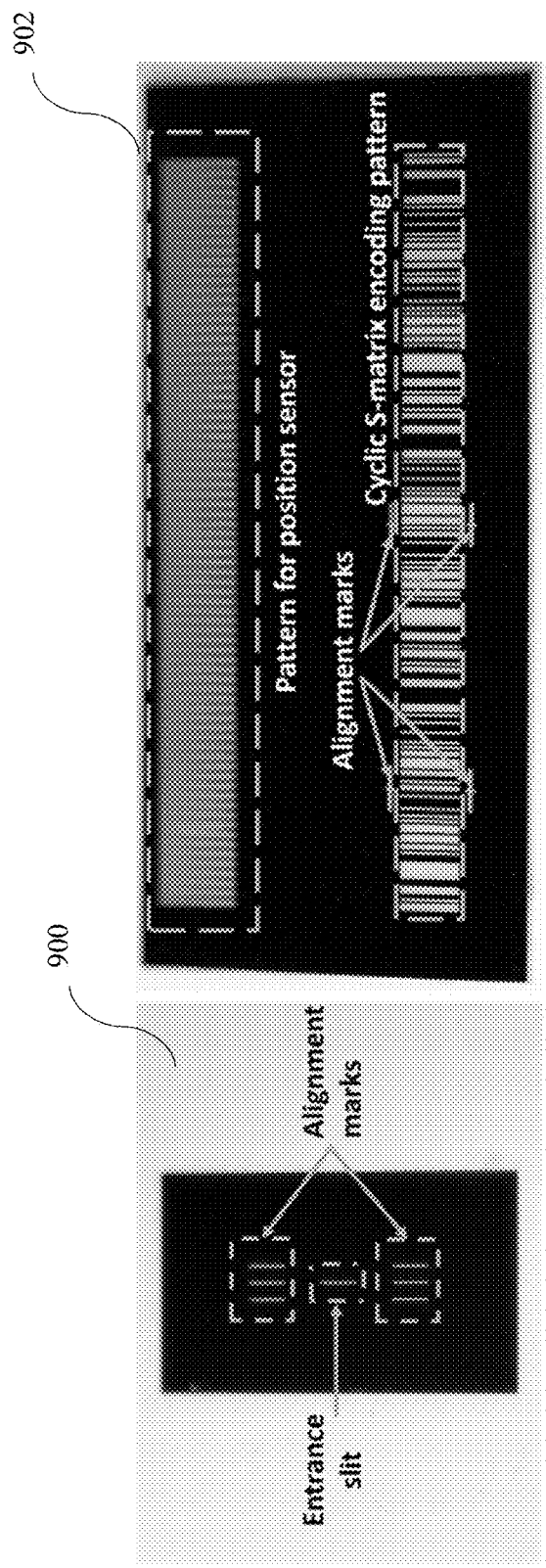
FIG. 7A shows a photograph of an entrance slit element for use in an example embodiment.
FIG. 7B shows a photograph of a mask for use in an example embodiment.

The slit 700 and mask 702 are fabricated on 0.5 mm thick aluminum oxide wafers, as pictured in FIG. 7. They are fabricated by first coating a layer of aluminum on the wafer, then laser cut to obtain the desired patterns. In FIG. 7(a), the entrance slit size is 50 μm×1 mm, with six identical slits above and below the entrance slit. The six slits above and below the entrance slit are used as alignment marks. The 635 nm laser illuminating the slits will form an astigmatic image on the alignment marks on the encoding mask 702 (FIG. 7(b)), allowing to ensure that the encoding mask is properly aligned and not tilted. After the alignment process, the six slits above and below the entrance slit are covered up with black tape.

A beam structure 800 was designed to ensure the stable movement of the mask, according to an example embodiment. The parameters of the beam structure 800 are shown in FIG. 8(a) and the finite element analysis conducted in Ansys is shown in FIG. 8(b). It has a maximum travel range of 13 mm.

Figure 9A:
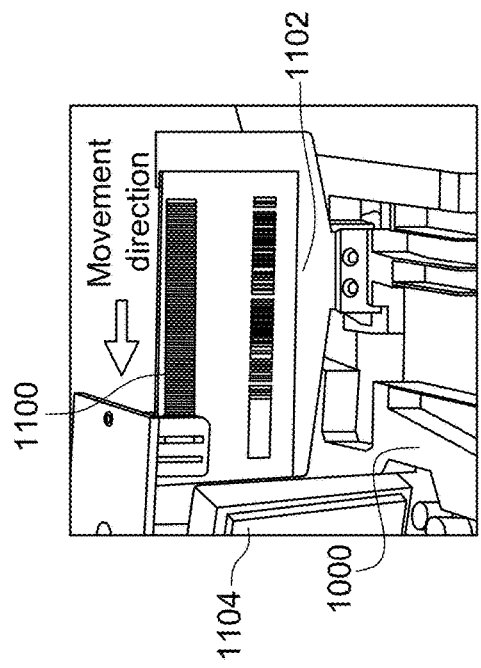
FIG. 9A shows a photograph of a low-cost linear motor 904 (VS-19 Pico Linear Servo) for use in an example embodiment.
Figure 9B:
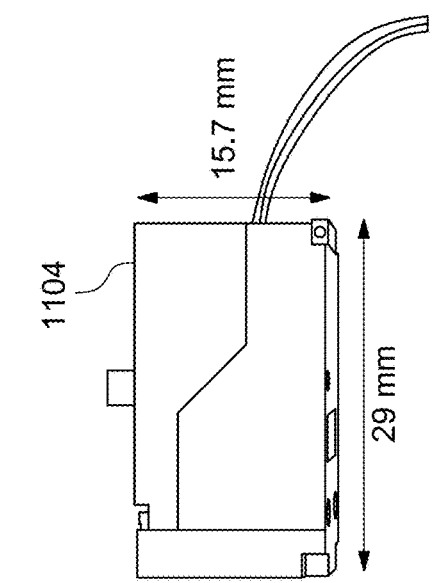
FIG. 9B shows a photograph of a mask attached to a holder and mounted onto a beam structure, according to an example embodiment.
Figure 9C:
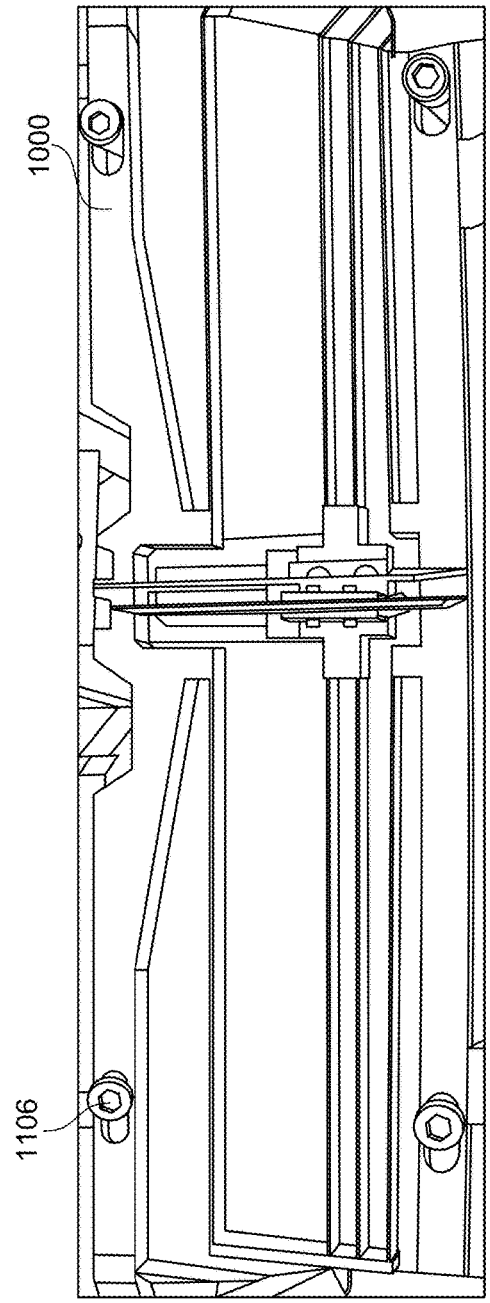
FIG. 9C shows a photograph of the beam structure with the mask attached to the holder, according to an example embodiment.

The beam structure 800 was fabricated by wire cutting of brass. The mask 900 is attached to a holder 902, then mounted onto the beam structure 800, as shown in FIGS. 9(b) and (c). It is actuated by a low-cost linear motor 904 (VS-19 Pico Linear Servo) (FIG. 9(a)). The motor 904 is attached to the beam structure 800 from the underside of the baseboard, as such four legs e.g. 906 were used to lift the beam structure 800 off the ground in the spectrometer according to an example embodiment.

Figure 10A:
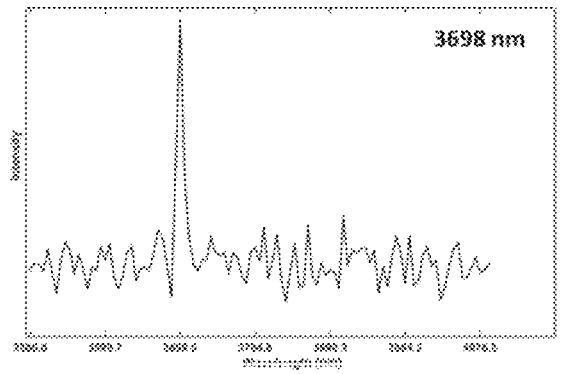
FIG. 10A shows mid-IR laser results illustrating the accuracy of a 635 nm laser self-calibration and the spectrometer resolution, according to an example embodiment.
Figure 10B:
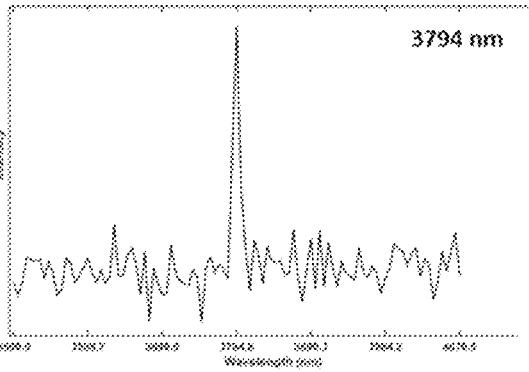
FIG. 10B shows mid-IR laser results illustrating the accuracy of the 635 nm laser self-calibration and the spectrometer resolution, according to an example embodiment.
Figure 10C:
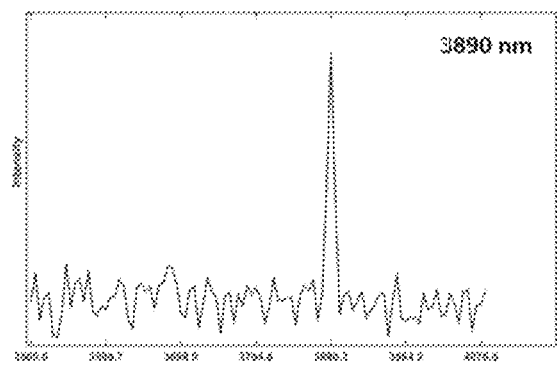
FIG. 10C shows mid-IR laser results illustrating the accuracy of the 635 nm laser self-calibration and the spectrometer resolution, according to an example embodiment.
Figure 10D:
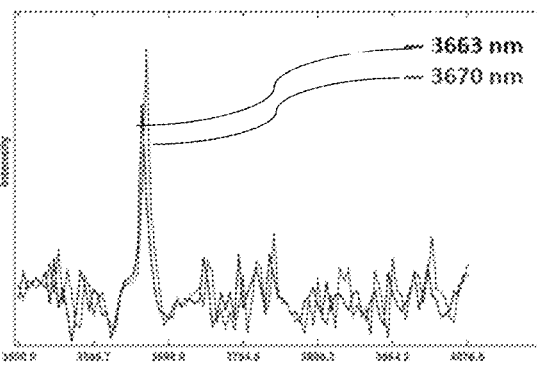
FIG. 10D shows mid-IR laser results illustrating the accuracy of the 635 nm laser self-calibration and the spectrometer resolution, according to an example embodiment.
Figure 10E:
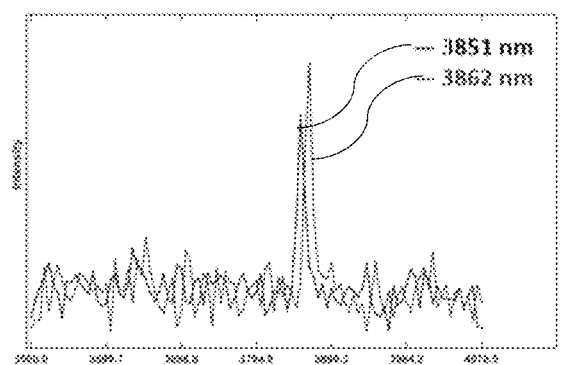
FIG. 10E shows mid-IR laser results illustrating the accuracy of the 635 nm laser self-calibration and the spectrometer resolution, according to an example embodiment.
Figure 10F:
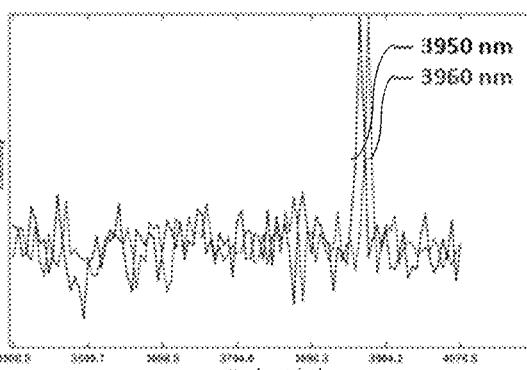
FIG. 10F shows mid-IR laser results illustrating the accuracy of the 635 nm laser self-calibration and the spectrometer resolution, according to an example embodiment.
Figure 11A:
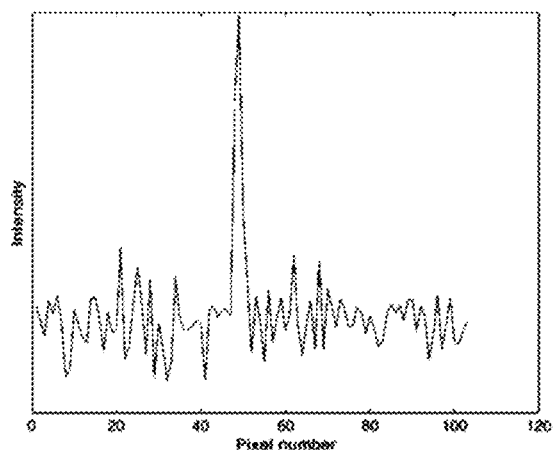
FIG. 11A shows 635 nm laser calibration results of a mid-IR spectrum of a lamp, according to an example embodiment.
Figure 11B:
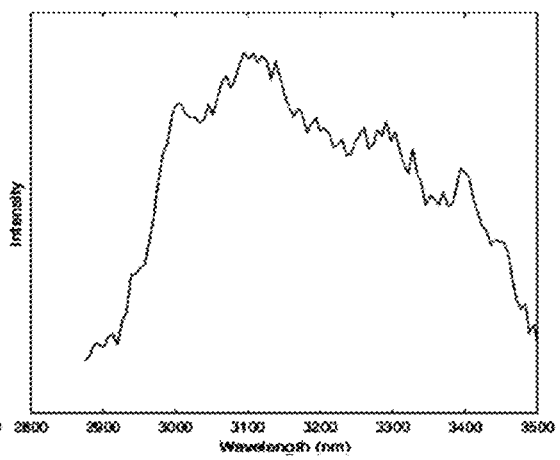
FIG. 11B shows the recovered mid-IR spectrums of the lamp, according to an example embodiment.
Figure 11C:
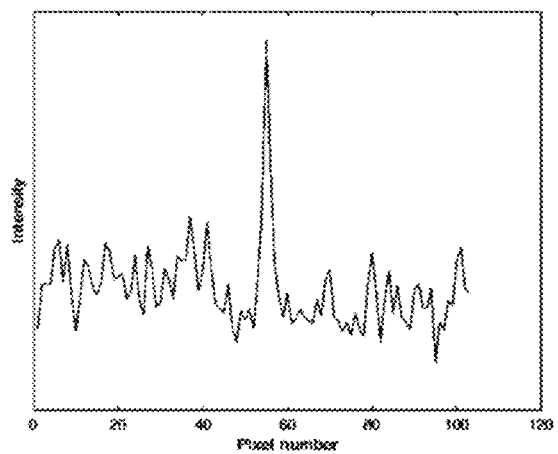
FIG. 11C shows 635 nm laser calibration results of another mid-IR spectrum of a lamp, according to an example embodiment.
Figure 11D:
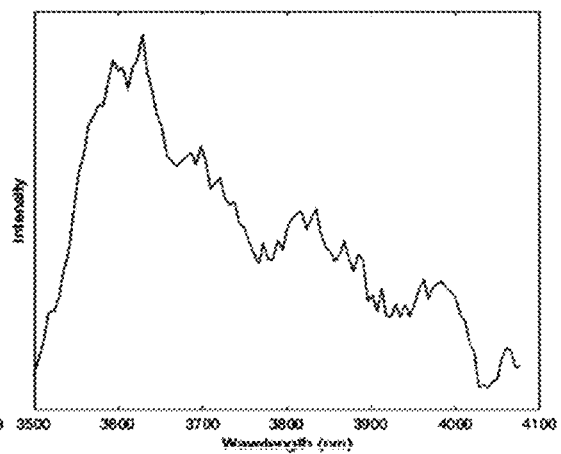
FIG. 11D shows the recovered mid-IR spectrums of the lamp, according to an example embodiment.

First, the accuracy of the 635 nm laser self-calibration and the spectrometer resolution using a mid-IR laser were tested, according to an example embodiment. The mid-IR laser can be tuned from 3630 nm to 4000 nm at 1 nm interval. Some mid-IR laser results are displayed in FIG. 10. From the tests, the accuracy of the 635 nm laser calibration was confirmed, as it manages to shift the mid-IR laser peak to the correct location on the spectrum, corresponding to the mid-IR laser output wavelength, see FIG. 10(a) to FIG. 10(c). FIGS. 10(d) to 10(f) demonstrates the resolution of the spectrometer according to an example embodiment. Comparing two adjacent peaks, the spectral resolution was around 10 nm. This was expectedly poorer than the designed resolution of 6 nm due to the influence of detector noise, and optical aberrations from manual alignment of components in the spectrometer.

A silicon carbide lamp with a parabolic reflector was then used as the IR light source for further testing. The lamp was placed about 15 cm from the entrance of the spectrometer according to an example embodiment. A 3000 nm to 3500 nm bandpass filter was tested first with the $5^{th}$ order of the 635 nm laser for calibration, followed by a 3500 nm to 4000 nm bandpass filter with the $6^{th}$ order of the 635 nm laser for calibration. Based on optical simulation, the $5^{th}$ order and $6^{th}$ order of the 635 nm laser, which superimposes on 3175 nm and 3810 nm, should fall on pixel number 49 and 55, respectively. The recovered mid-IR spectrums (after calibration) of the lamp and their corresponding 635 nm laser calibration results are shown in FIG. 11.

Some plastic samples were also tested. Since most polymers have absorption peaks around 3500 nm, a 3200 nm to 3800 nm bandpass filter and the $6^{th}$ order of the 635 nm laser for calibration were used. This is possible because this range is within the 103 cyclic S-matrix pixels and can thus be encoded properly as well, according to an example embodiment. The reference spectrum of the lamp is first taken. The samples are then individually placed between the lamp and the bandpass filter at the entrance of the spectrometer body (compare e.g. FIG. 1) and tested. The plastic samples tested included cling wrap, Ziploc, a glove and a sheet of plastic. From the transmission spectrum of the sample and the spectrum of the lamp, one can obtain the absorption spectrum using the following equation:

$$A = 1 - \left(\frac{T}{R}\right) \quad (4)$$

where A and T are the absorption spectrum and transmission spectrum of the sample, respectively, and R is the reference transmission spectrum of the lamp.

Figures 12A, 12B:
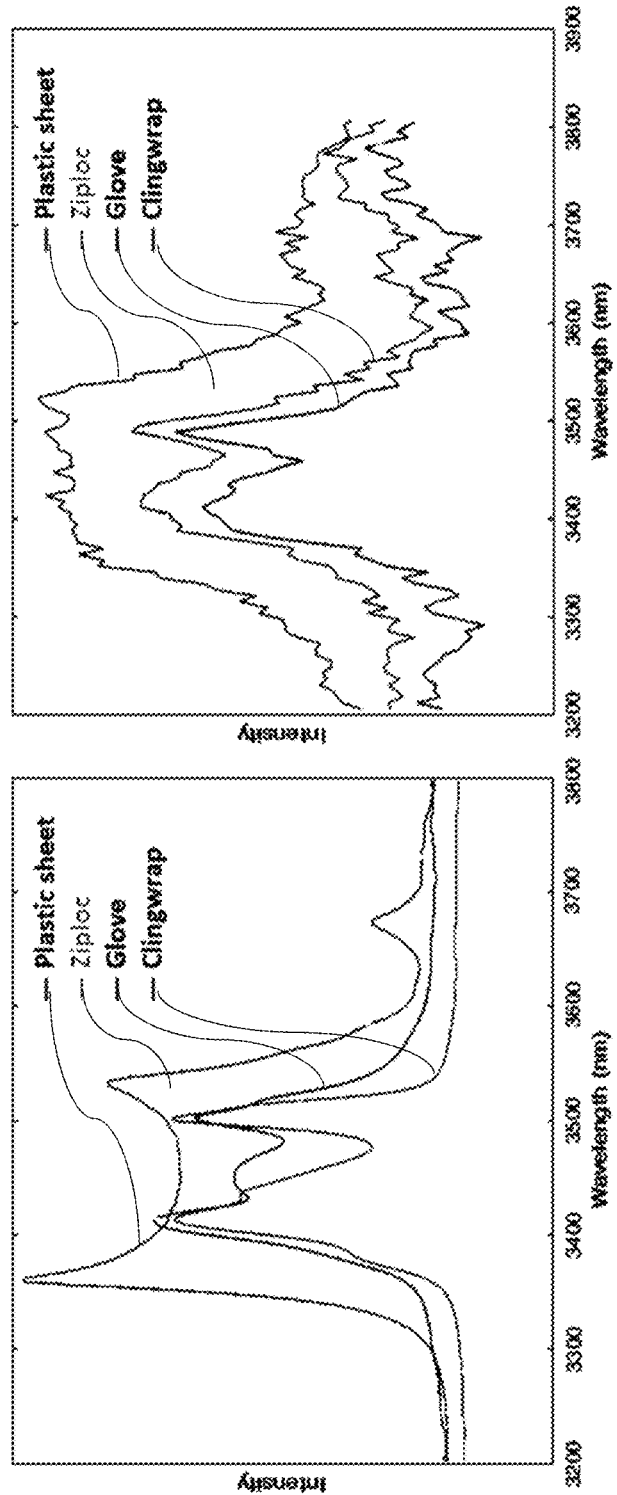
FIG. 12A shows the mid-IR absorption spectrums of plastic samples taken by an FTIR spectrometer.
FIG. 12B shows the mid-IR absorption spectrums of plastic samples taken by a spectrometer according to an example embodiment.

To verify the absorption spectrums obtained, the plastic samples were also tested with an FTIR spectrometer. The mid-IR absorption spectrums of the plastic samples taken by the FTIR spectrometer and the spectrometer according to an example embodiment are displayed in FIG. 12(a) and (b), respectively. It can be seen that the results obtained by the mid-IR spectrometer according to an example embodiment matches those taken by the FTIR spectrometer, even though some of the peaks may not be as distinct.

As described above, a single-pixel detector Hadamard transform spectrometer is provided according to an example embodiment. The spectrometer according to an example embodiment is split into two bands, 2875 nm to 3500 nm and 3500 nm to 4077 nm, as it is designed to encode in a cascaded manner. Each band has 103 pixels, giving a designed spectral resolution of around 6 nm. The encoded band can be changed by switching the bandpass filter used. Cascading the wavelength sensing range of the spectrometer advantageously reduces the required travel range of the mask without sacrificing the spectral resolution of the system, according to an example embodiment. As such, the size and cost of the motor required to actuate the mask can be reduced as well, allowing for a more compact and cost-effective spectrometer. Additionally, a self-calibration mechanism is implemented using a 635 nm laser, according to an example embodiment. This allows the mid-IR spectrum to be recovered accurately without the need for an expensive motor stage with position control. The spectrometer according to an example embodiment was demonstrated with a mid-IR laser to illustrate its accuracy in recovering the mid-IR spectrum in the correct position. It was also tested with plastic samples and proves that the spectrometer can accurately obtain their absorption spectrums. A cascaded, self-calibrated, single-pixel detector Hadamard transform spectrometer according to an example embodiment can be useful for field-use IR spectroscopy due to the increase in SNR provided by the multiplexing and single-pixel detector. The cascaded encoding and self-calibration mechanism reduces the size and cost of the system according to an example embodiment, making it more portable and cost-effective. Since IR spectroscopy, especially mid-IR spectroscopy, is commonly used to identify chemical compounds, the design according to an example embodiment provides a practical way to miniaturize an IR spectrometer for field use. As such, an example embodiment can be useful in a wide range of applications, including environmental monitoring, pharmaceutics, polymer identification, food processing and agriculture.

In one embodiment, an infrared spectrometer is provided, comprising a first single pixel detector sensitive to infrared light in a first spectral range; an entrance slit for receiving an infrared light signal; a moveable encoding mask disposed between the entrance slit and the first single pixel detector for encoding based multiplexing, the moveable encoding mask comprising at least three adjacent coding sections along an encoding moving direction thereof, each coding section comprising the same coding pattern in a cyclic manner such that the last encoding step of one section is the same as the first encoding step in the next section; a dispersion and imaging optics disposed between the entrance slit and the moveable encoding mask for dispersing the infrared signal and for imaging the dispersed infrared signal onto the moveable encoding mask; a collection optics disposed between the moveable encoding mask and the first single pixel detector for collecting an encoding based multiplexed version of the infrared signal onto the first single pixel photodetector; and a band selection optics for selectively allowing only one of at least first and second bands within the first spectral range to be imaged onto respective ones of the coding sections excluding a first coding section along the encoding moving direction of the moveable encoding mask, in a starting position of the moveable encoding mask.

The spectrometer may comprise a second single pixel detector sensitive to a wavelength of a reference laser signal, wherein the dispersion and imaging optics is configured to image the reference laser signal received via the entrance slit onto the moveable encoding mask and the collection optics is configured for collecting the reference laser signal comprised in the encoding based multiplexed version of the infrared signal onto the second single pixel detector for calibration of a recovered spectrum of interest within the first spectral range in the first single pixel detector. The dispersion and imaging optics may comprise a first grating for generating different order signals from the reference laser signal for imaging onto respective different encoding sections of the moveable encoding mask, and the collection optics comprises a second grating for re-generating the reference laser signal at the wavelength to which the second single detector is sensitive. The dispersion and imaging optics may comprise a blocking element for selectively allowing only one of the different order signals to be imaged onto the moveable encoding mask.

The moveable encoding mask may comprise a movement calibration pattern outside the at least three coding sections, and the spectrometer further comprises an encoder module coupled to the moveable encoding mask for generating a varying output signal based on movement of the movement calibration pattern relative to the encoder module. The movement calibration pattern may comprise slits or pixels, and the encoding module generates an output signal representative of movements in steps of single slits or pixels of the encoding sections.

The slits or pixels may have twice a width of slits or pixels of the encoding sections, and the encoding module generates a two phase output signal representative of movements in steps of single slits or pixels of the encoding sections.

The slits or pixels may have the same width of slits or pixels of the encoding sections, and the encoding module generates a single phase output signal representative of movements in steps of single slits or pixels of the encoding sections.

The spectrometer may comprise a processor for recovery of the spectrum of interest within the first spectral range in the first single pixel detector. The encoding sections may comprise an S-matrix pattern, and the processor is configured for inverse Hadamard transform for the recovery of the spectrum of interest within the first spectral range in the first single pixel detector.

In one embodiment, an infrared spectrometer is provided, comprising a first single pixel detector sensitive to infrared light in a first spectral range; an entrance slit for receiving an infrared light signal; a moveable encoding mask disposed between the entrance slit and the first single pixel detector for encoding based multiplexing, the moveable encoding mask comprising one or more adjacent coding sections; a dispersion and imaging optics disposed between the entrance slit and the moveable encoding mask for dispersing the infrared signal and for imaging the dispersed infrared signal onto the moveable encoding mask; a collection optics disposed between the moveable encoding mask and the first single pixel detector for collecting an encoding based multiplexed version of the infrared signal onto the first single pixel photodetector; and a second single pixel detector sensitive to a wavelength of a reference laser signal, wherein the dispersion and imaging optics is configured to image the reference laser signal received via the entrance slit onto the moveable encoding mask and the collection optics is configured for collecting the reference laser signal comprised in the encoding based multiplexed version of the infrared signal onto the second single pixel detector for calibration of a recovered spectrum of interest within the first spectral range in the first single pixel detector.

The moveable encoding mask may comprise a movement calibration pattern outside the one or more adjacent coding sections, and the spectrometer further comprises an encoder module coupled to the moveable encoding mask for generating a varying output signal based on movement of the movement calibration pattern relative to the encoder module. The movement calibration pattern may comprise slits or pixels, and the encoding module generates an output signal representative of movements in steps of single slits or pixels of the encoding sections.

The slits or pixels may have twice a width of slits or pixels of the encoding sections, and the encoding module generates a two phase output signal representative of movements in steps of single slits or pixels of the encoding sections.

The slits or pixels may have the same width of slits or pixels of the encoding sections, and the encoding module generates a single phase output signal representative of movements in steps of single slits or pixels of the encoding sections.

Figure 13:
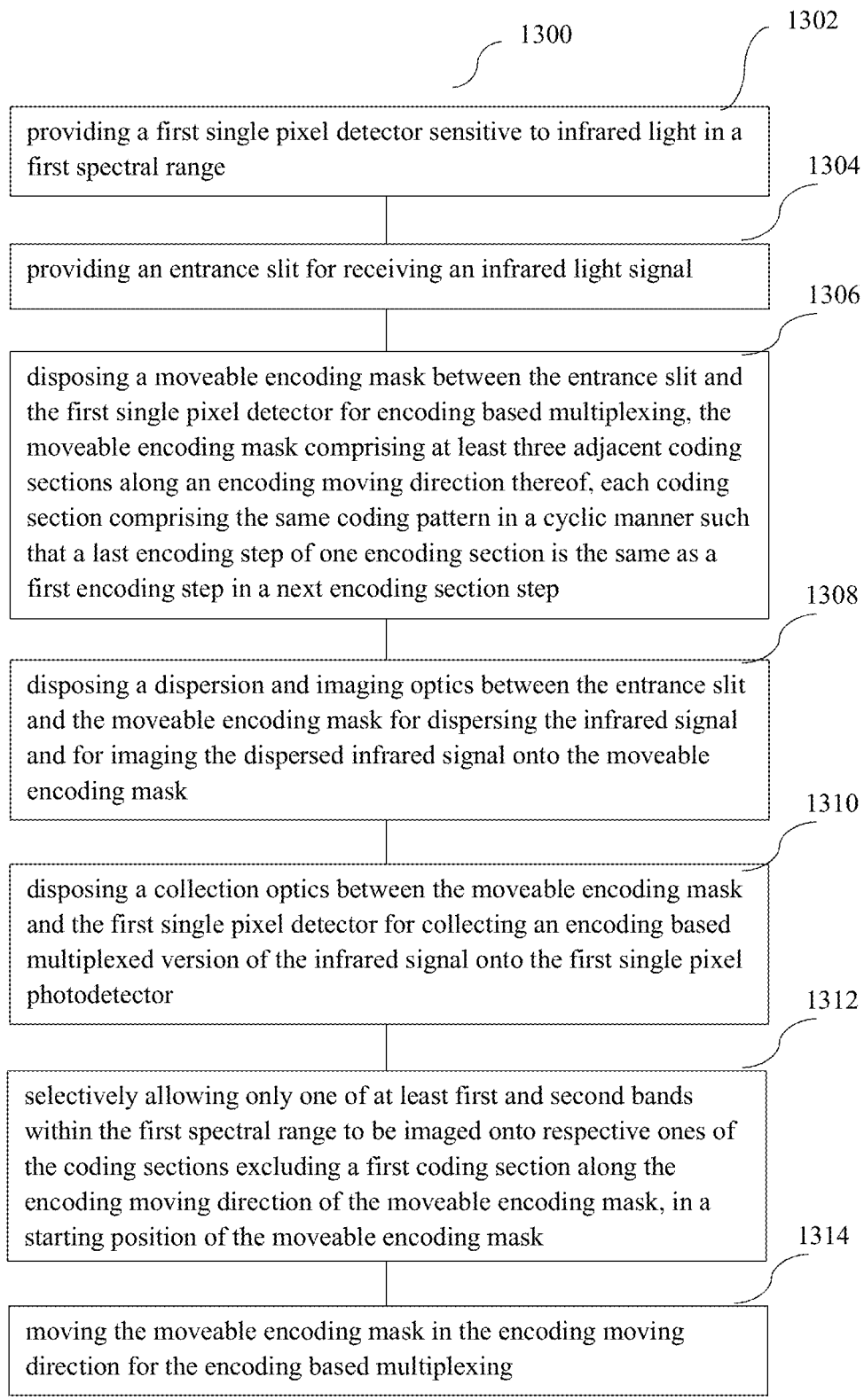
FIG. 13 shows a flowchart illustrating a method of performing infrared spectrometry, according to an example embodiment.

FIG. 13 shows a flowchart 1300 illustrating a method of performing infrared spectrometry, according to an example embodiment. At step 1302, a first single pixel detector sensitive to infrared light in a first spectral range is provided. At step 1304, an entrance slit for receiving an infrared light signal is provided. At step 1306, a moveable encoding mask is disposed between the entrance slit and the first single pixel detector for encoding based multiplexing, the moveable encoding mask comprising at least three adjacent coding sections along an encoding moving direction thereof, each coding section comprising the same coding pattern in a cyclic manner such that a last encoding step of one encoding section is the same as a first encoding step in a next encoding section step. At step 1308, a dispersion and imaging optics is disposed between the entrance slit and the moveable encoding mask for dispersing the infrared signal and for imaging the dispersed infrared signal onto the moveable encoding mask. At step 1310, a collection optics is disposed between the moveable encoding mask and the first single pixel detector for collecting an encoding based multiplexed version of the infrared signal onto the first single pixel photodetector. At step 1312, only one of at least first and second bands within the first spectral range is selectively allowed to be imaged onto respective ones of the coding sections excluding a first coding section along the encoding moving direction of the moveable encoding mask, in a starting position of the moveable encoding mask. At step 1314, the moveable encoding mask is moved in the encoding moving direction for the encoding based multiplexing.

The method may comprise providing a second single pixel detector sensitive to a wavelength of a reference laser signal, and configuring the dispersion and imaging optics to image the reference laser signal received via the entrance slit onto the moveable encoding mask and configuring the collection optics to collect the reference laser signal comprised in the encoding based multiplexed version of the infrared signal onto the second single pixel detector for calibration of a recovered spectrum of interest within the first spectral range in the first single pixel detector. The dispersion and imaging optics may comprise a first grating for generating different order signals from the reference laser signal for imaging onto respective different encoding sections of the moveable encoding mask, and the collection optics comprises a second grating for re-generating the reference laser signal at the wavelength to which the second single detector is sensitive. The dispersion and imaging optics may comprise a blocking element and the method comprises selectively allowing only one of the different order signals to be imaged onto the moveable encoding mask.

The moveable encoding mask may comprise a movement calibration pattern outside the at least three coding sections, and the method may further comprise using an encoder module coupled to the moveable encoding mask for generating a varying output signal based on movement of the movement calibration pattern relative to the encoder module. The movement calibration pattern may comprise slits or pixels, and the encoding module may generate an output signal representative of movements in steps of single slits or pixels of the encoding sections.

The slits or pixels may have twice a width of slits or pixels of the encoding sections, and the encoding module may generate a two phase output signal representative of movements in steps of single slits or pixels of the encoding sections.

The slits or pixels may have the same width of slits or pixels of the encoding sections, and the encoding module may generate a single phase output signal representative of movements in steps of single slits or pixels of the encoding sections.

The method may comprise using a processor for recovery of the spectrum of interest within the first spectral range in the first single pixel detector. The encoding sections may comprise an S-matrix pattern, and the method may comprise performing inverse Hadamard transform using the processor for the recovery of the spectrum of interest within the first spectral range in the first single pixel detector.

Figure 14:
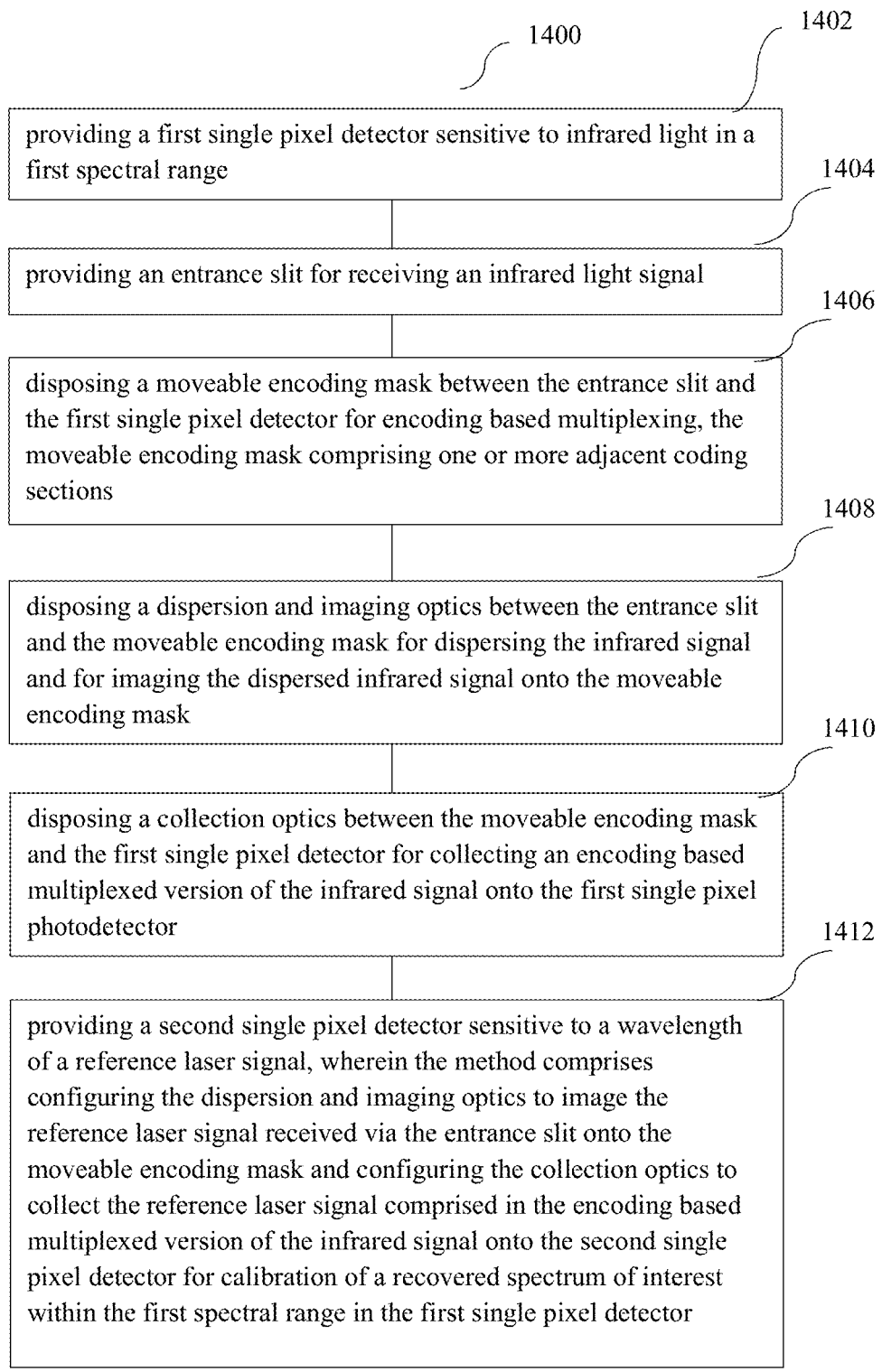
FIG. 14 shows a flowchart illustrating a method of performing infrared spectrometry, according to another example embodiment.

FIG. 14 shows a flowchart 1400 illustrating a method of performing infrared spectrometry, according to an example embodiment. At step 1402, a first single pixel detector sensitive to infrared light in a first spectral range is provided. At step 1404, an entrance slit for receiving an infrared light signal is provided. At step 1406, a moveable encoding mask is disposed between the entrance slit and the first single pixel detector for encoding based multiplexing, the moveable encoding mask comprising one or more adjacent coding sections. At step 1408, a dispersion and imaging optics is disposed between the entrance slit and the moveable encoding mask for dispersing the infrared signal and for imaging the dispersed infrared signal onto the moveable encoding mask. At step 1412, a collection optics is disposed between the moveable encoding mask and the first single pixel detector for collecting an encoding based multiplexed version of the infrared signal onto the first single pixel photodetector. At step 1414, a second single pixel detector sensitive to a wavelength of a reference laser signal is provided, wherein the method comprises configuring the dispersion and imaging optics to image the reference laser signal received via the entrance slit onto the moveable encoding mask and configuring the collection optics to collect the reference laser signal comprised in the encoding based multiplexed version of the infrared signal onto the second single pixel detector for calibration of a recovered spectrum of interest within the first spectral range in the first single pixel detector.

The moveable encoding mask may comprise a movement calibration pattern outside the one or more adjacent coding sections, and the method may further comprises using an encoder module coupled to the moveable encoding mask for generating a varying output signal based on movement of the movement calibration pattern relative to the encoder module. The movement calibration pattern may comprises slits or pixels, and the encoding module may generate an output signal representative of movements in steps of single slits or pixels of the encoding sections.

The slits or pixels may have twice a width of slits or pixels of the encoding sections, and the encoding module may generate a two phase output signal representative of movements in steps of single slits or pixels of the encoding sections.

The slits or pixels may have the same width of slits or pixels of the encoding sections, and the encoding module may generate a single phase output signal representative of movements in steps of single slits or pixels of the encoding sections.

Aspects of the systems and methods described such as the motor control, calibration processing and spectrum recovery, herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above." "below;" and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. An infrared spectrometer comprising:
a first single pixel detector sensitive to infrared light in a first spectral range;
an entrance slit for receiving an infrared light signal;
a moveable encoding mask disposed between the entrance slit and the first single pixel detector for encoding based multiplexing, the moveable encoding mask comprising at least three adjacent coding sections along an encoding moving direction thereof, each coding section comprising the same coding pattern in a cyclic manner such that the last encoding step of one section is the same as the first encoding step in the next section;
a dispersion and imaging optics disposed between the entrance slit and the moveable encoding mask for dispersing the infrared signal and for imaging the dispersed infrared signal onto the moveable encoding mask;
a collection optics disposed between the moveable encoding mask and the first single pixel detector for collecting an encoding based multiplexed version of the infrared signal onto the first single pixel photodetector; and
a band selection optics for selectively allowing only one of at least first and second bands within the first spectral range to be imaged onto respective ones of the coding sections excluding a first coding section along the encoding moving direction of the moveable encoding mask, in a starting position of the moveable encoding mask.

2. The spectrometer of claim 1, comprising a second single pixel detector sensitive to a wavelength of a reference laser signal, wherein the dispersion and imaging optics is configured to image the reference laser signal received via the entrance slit onto the moveable encoding mask and the collection optics is configured for collecting the reference laser signal comprised in the encoding based multiplexed version of the infrared signal onto the second single pixel detector for calibration of a recovered spectrum of interest within the first spectral range in the first single pixel detector.

3. The spectrometer of claim 2, wherein the dispersion and imaging optics comprises a first grating for generating different order signals from the reference laser signal for imaging onto respective different encoding sections of the moveable encoding mask, and the collection optics comprises a second grating for re-generating the reference laser signal at the wavelength to which the second single detector is sensitive, and preferably wherein the dispersion and imaging optics comprises a blocking element for selectively allowing only one of the different order signals to be imaged onto the moveable encoding mask.

4. The spectrometer of claim 1, wherein the moveable encoding mask comprises a movement calibration pattern outside the at least three coding sections, and the spectrometer further comprises an encoder module coupled to the moveable encoding mask for generating a varying output signal based on movement of the movement calibration pattern relative to the encoder module.

5. The spectrometer of claim 4, wherein the movement calibration pattern comprises slits or pixels, and the encoding module generates an output signal representative of movements in steps of single slits or pixels of the encoding sections.

6. The spectrometer of claim 5, wherein the slits or pixels have twice a width of slits or pixels of the encoding sections, and the encoding module generates a two phase output signal representative of movements in steps of single slits or pixels of the encoding sections or wherein the slits or pixels have the same width of slits or pixels of the encoding sections, and the encoding module generates a single phase output signal representative of movements in steps of single slits or pixels of the encoding sections.

7. The spectrometer of claim 1, comprising a processor for recovery of the spectrum of interest within the first spectral range in the first single pixel detector, and preferably wherein the encoding sections comprise an S-matrix pattern, and the processor is configured for inverse Hadamard transform for the recovery of the spectrum of interest within the first spectral range in the first single pixel detector.

8. A method of performing infrared spectrometry using the infrared spectrometer of claim 1, comprising the steps of:

providing the first single pixel detector sensitive to infrared light in the first spectral range;

providing the entrance slit for receiving the infrared light signal;

disposing the moveable encoding mask between the entrance slit and the first single pixel detector for encoding based multiplexing, the moveable encoding mask comprising at least three adjacent coding sections along the encoding moving direction thereof, each coding section comprising the same coding pattern in the cyclic manner such that the last encoding step of one encoding section is the same as the first encoding step in the next encoding section step;

disposing the dispersion and imaging optics between the entrance slit and the moveable encoding mask for dispersing the infrared signal and for imaging the dispersed infrared signal onto the moveable encoding mask;

disposing the collection optics between the moveable encoding mask and the first single pixel detector for collecting an encoding based multiplexed version of the infrared signal onto the first single pixel photodetector;

selectively allowing only one of at least first and second bands within the first spectral range to be imaged onto respective ones of the coding sections excluding the first coding section along the encoding moving direction of the moveable encoding mask, in the starting position of the moveable encoding mask; and moving the moveable encoding mask in the encoding moving direction for the encoding based multiplexing.

9. The method of claim 8, comprising providing a second single pixel detector sensitive to a wavelength of a reference laser signal, and configuring the dispersion and imaging optics to image the reference laser signal received via the entrance slit onto the moveable encoding mask and configuring the collection optics to collect the reference laser signal comprised in the encoding based multiplexed version of the infrared signal onto the second single pixel detector for calibration of a recovered spectrum of interest within the first spectral range in the first single pixel detector.

10. The method of claim 9, wherein the dispersion and imaging optics comprises a first grating for generating different order signals from the reference laser signal for imaging onto respective different encoding sections of the moveable encoding mask, and the collection optics comprises a second grating for re-generating the reference laser signal at the wavelength to which the second single detector is sensitive, and preferably wherein the dispersion and imaging optics comprises a blocking element and the method comprises selectively allowing only one of the different order signals to be imaged onto the moveable encoding mask.

11. The method of claim 8, wherein the moveable encoding mask comprises a movement calibration pattern outside the at least three coding sections, and the method further comprises using an encoder module coupled to the moveable encoding mask for generating a varying output signal based on movement of the movement calibration pattern relative to the encoder module.

12. The method of claim 11, wherein the movement calibration pattern comprises slits or pixels, and the encoding module generates an output signal representative of movements in steps of single slits or pixels of the encoding sections, and preferably wherein the slits or pixels have twice a width of slits or pixels of the encoding sections, and the encoding module generates a two phase output signal representative of movements in steps of single slits or pixels of the encoding sections, or wherein the slits or pixels have the same width of slits or pixels of the encoding sections, and the encoding module generates a single phase output signal representative of movements in steps of single slits or pixels of the encoding sections.

13. The method of claim 8, comprising using a processor for recovery of the spectrum of interest within the first spectral range in the first single pixel detector.

14. The method of claim 13, wherein the encoding sections comprises an S-matrix pattern, and the method comprises performing inverse Hadamard transform using the processor for the recovery of the spectrum of interest within the first spectral range in the first single pixel detector.

15. An infrared spectrometer comprising:

a first single pixel detector sensitive to infrared light in a first spectral range;

an entrance slit for receiving an infrared light signal;

a moveable encoding mask disposed between the entrance slit and the first single pixel detector for encoding based multiplexing, the moveable encoding mask comprising one or more adjacent coding sections;

a dispersion and imaging optics disposed between the entrance slit and the moveable encoding mask for dispersing the infrared signal and for imaging the dispersed infrared signal onto the moveable encoding mask;

a collection optics disposed between the moveable encoding mask and the first single pixel detector for collecting an encoding based multiplexed version of the infrared signal onto the first single pixel photodetector; and a second single pixel detector sensitive to a wavelength of a reference laser signal, wherein the dispersion and imaging optics is configured to image the reference laser signal received via the entrance slit onto the moveable encoding mask and the collection optics is configured for collecting the reference laser signal comprised in the encoding based multiplexed version of the infrared signal onto the second single pixel detector for calibration of a recovered spectrum of interest within the first spectral range in the first single pixel detector.

16. The spectrometer of claim 15, wherein the moveable encoding mask comprises a movement calibration pattern outside the one or more adjacent coding sections, and the spectrometer further comprises an encoder module coupled to the moveable encoding mask for generating a varying output signal based on movement of the movement calibration pattern relative to the encoder module.

17. The spectrometer of claim 16, wherein the movement calibration pattern comprises slits or pixels, and the encoding module generates an output signal representative of movements in steps of single slits or pixels of the encoding sections, and preferably wherein the slits or pixels have twice a width of slits or pixels of the encoding sections, and the encoding module generates a two phase output signal representative of movements in steps of single slits or pixels of the encoding sections or wherein the slits or pixels have the same width of slits or pixels of the encoding sections, and the encoding module generates a single phase output signal representative of movements in steps of single slits or pixels of the encoding sections.

18. A method of performing infrared spectrometry using the infrared spectrometer of claim 15, comprising the steps of:

providing the first single pixel detector sensitive to infrared light in the first spectral range;

providing the entrance slit for receiving the infrared light signal;

disposing the moveable encoding mask between the entrance slit and the first single pixel detector for encoding based multiplexing, the moveable encoding mask comprising the one or more adjacent coding sections;

disposing the dispersion and imaging optics between the entrance slit and the moveable encoding mask for dispersing the infrared signal and for imaging the dispersed infrared signal onto the moveable encoding mask;

disposing the collection optics between the moveable encoding mask and the first single pixel detector for collecting the encoding based multiplexed version of the infrared signal onto the first single pixel photodetector; and providing the second single pixel detector sensitive to a wavelength of a reference laser signal, wherein the method comprises configuring the dispersion and imaging optics to image the reference laser signal received via the entrance slit onto the moveable encoding mask and configuring the collection optics to collect the reference laser signal comprised in the encoding based multiplexed version of the infrared signal onto the second single pixel detector for calibration of the recovered spectrum of interest within the first spectral range in the first single pixel detector.

19. The method of claim 18, wherein the moveable encoding mask comprises a movement calibration pattern outside the one or more adjacent coding sections, and the method further comprises using an encoder module coupled to the moveable encoding mask for generating a varying output signal based on movement of the movement calibration pattern relative to the encoder module.

20. The method of claim 19, wherein the movement calibration pattern comprises slits or pixels, and the encoding module generates an output signal representative of movements in steps of single slits or pixels of the encoding sections, and preferably wherein the slits or pixels have twice a width of slits or pixels of the encoding sections, and the encoding module generates a two phase output signal representative of movements in steps of single slits or pixels of the encoding sections, or wherein the slits or pixels have the same width of slits or pixels of the encoding sections, and the encoding module generates a single phase output signal representative of movements in steps of single slits or pixels of the encoding sections.

* * * * *